(12) United States Patent  
Kalverkamp et al.

(10) Patent No.: US 8,028,507 B2
(45) Date of Patent: Oct. 4, 2011

(54) PICKING ARRANGEMENT FOR PICKING FRUIT ON AN ELONGATE STEM

(75) Inventors: Klemens Kalverkamp, Damme (DE); Felix Kalverkamp, Damme (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 59 days.

(21) Appl. No.: 12/160,572

(22) PCT Filed: Jan. 11, 2007

(86) PCT No.: PCT/EP2007/000218
§ 371 (c)(1),
(2), (4) Date: Mar. 24, 2010

(87) PCT Pub. No.: WO2007/082680
PCT Pub. Date: Jul. 26, 2007

(65) Prior Publication Data
US 2010/0175356 A1    Jul. 15, 2010

(30) Foreign Application Priority Data
Jan. 11, 2006   (DE) .......................... 10 2006 001 383

(51) Int. Cl.
*A01D 45/02*    (2006.01)
(52) U.S. Cl. .......................................... 56/103; 56/503
(58) Field of Classification Search ............... 56/103, 56/51, 52, 64, 65, 104, 105, 109, 113, 116, 56/117, 119, 503
See application file for complete search history.

(56) References Cited

U.S. PATENT DOCUMENTS

| | | | | |
|---|---|---|---|---|
| 3,791,117 A | * | 2/1974 | Lawrence | 56/98 |
| 3,803,820 A | * | 4/1974 | Knapp | 56/98 |
| 3,807,152 A | * | 4/1974 | Storm et al. | 56/98 |
| 4,233,805 A | * | 11/1980 | van der Lely | 56/192 |
| 4,251,981 A | * | 2/1981 | van der Lely | 56/192 |
| 4,478,027 A | * | 10/1984 | De Coene et al. | 56/16.4 R |
| 4,487,003 A | * | 12/1984 | Mathews et al. | 56/13.6 |
| 4,553,379 A | * | 11/1985 | Kalverkamp | 56/60 |
| 5,546,737 A | * | 8/1996 | Moosbrucker | 56/94 |
| 5,651,243 A | * | 7/1997 | Arnold et al. | 56/94 |
| 5,661,964 A | | 9/1997 | Paulson et al. | |
| 5,878,559 A | | 3/1999 | Cooksey et al. | |
| 6,032,444 A | * | 3/2000 | Herron et al. | 56/60 |
| 6,272,820 B1 | * | 8/2001 | Otten et al. | 56/13.9 |
| 7,047,717 B1 | * | 5/2006 | Wolters et al. | 56/60 |
| 7,062,897 B2 | * | 6/2006 | Rickert et al. | 56/103 |
| 7,222,478 B2 | * | 5/2007 | Bruening et al. | 56/51 |

FOREIGN PATENT DOCUMENTS

| | | |
|---|---|---|
| DE | 196 22 716 A1 | 12/1996 |
| DE | 196 22 719 A1 | 12/1996 |
| DE | 20 2005 003 236 U1 | 6/2005 |
| EP | 1 106 049 A1 | 6/2001 |
| GB | 1044516 | 10/1966 |

* cited by examiner

*Primary Examiner* — Arpad Fabian-Kovacs
(74) *Attorney, Agent, or Firm* — Merchant & Gould P.C.

(57) ABSTRACT

Picking arrangement for picking at least one fruit (36) located on an elongate stem (33) of a plant (34), has a holder (3), that can be moved along the ground (9), and having an elongate picking gap (30), which is provided on the holder (3), bounded by lateral edges (31) and through which the stem (33) can be guided. The fruit (36) is separated off along the edges (31) in the process, wherein the picking gap (30) is oriented such that the step (33) can be fed to the picking gap (30) with its longitudinal axis oriented parallel, or essentially parallel, to the longitudinal axis of the picking gap (30).

45 Claims, 23 Drawing Sheets

PICKING ARRANGEMENT FOR PICKING FRUIT ON AN ELONGATE STEM

BACKGROUND OF THE INVENTION

1. Field of the Invention

The present device relates to a picking arrangement for the picking of at least one fruit located on an elongate stem of a plant, having a support movable along the ground and an elongate picking gap provided on the support, the support being bordered by lateral edges, through which picking gap the stem can be guided while the fruit is separated off at the edges. The invention further relates to a picking attachment with several such picking arrangements, as well as to a method for picking at least one fruit located on an elongate stem of a plant, wherein the stem is guided to an elongate picking gap bordered by lateral edges and then the fruit is separated from the stem at the edges as the stem is guided through the picking gap.

2. Description of the Prior Art

Known from DE 32 13 542 A1 is a method and a device for harvesting corn and other grain fruits, wherein the plant is drawn through intake rollers, arranged underneath a picking gap, into the harvesting device. The picking gap provides for a separation of the cobs or other fruits from the plant, the separation of the cob and plant taking place substantially through the breaking of the cob stem against a breaking edge.

Known form U.S. Pat. No. 5,661,964 is a harvesting machine for harvesting corn, wherein an elongate picking gap is inclined in the direction of travel by more than 45° with respect to a vertical to the ground. For harvesting cobs of corn the corn stalk is guided through the picking gap while oriented approximately perpendicularly to the latter.

Known from DE 196 22 719 A1 is a row unit for harvesting corn, wherein the corn stalks are grasped by an intake chain and are guided into stripping slits formed by stripping cylinders. The stripping cylinders draw the corn stalks through the stripping slits and the corn cobs are separated from the stalks when they come into contact with the stripping plates. The corn cobs are then conveyed rearwardly by grippers of the intake chain and brought into a trough via a conveyor auger.

SUMMARY OF THE INVENTION

The corn stalks are guided to the stripping slit in one direction and are then, in a direction perpendicular to this, are pulled through the stripping slit. If the speed at which the row unit is traveling over the cornfield exceeds a certain value, there occurs an excessive accumulation of corn stalks in the stripping slit, so that corn stalks moving up can prevent the stripping of the corn cobs from the corn stalks previously drawn in. As a remedy, the throughput speed of the corn stalks through the stripping slit could be increased. However, above a certain throughput speed this leads to a damaging of the corn cobs. In order to reduce harvesting losses, the harvesting speed is thus limited.

Proceeding from this prior art, the task of the invention is to make it possible to increase the harvesting speed while at the same time sparing the fruits to be harvested.

The picking arrangement according to the invention for the picking of at least one fruit located on an elongate stem of a plant exhibits a support that is movable along the ground, and an elongate picking gap provided on the support and bounded by lateral edges, through which gap the stem can be guided during the separating of the fruit at the edges, the picking gap being so oriented that the stem can be guided with its longitudinal axis parallel or substantially parallel to the longitudinal axis of the picking gap.

By means of the picking arrangement according to the invention it is possible to guide the stem to the picking gap, or to take up the stem by the latter, and then guide it through the picking gap, in an axis-parallel or substantially axis-parallel manner. In this way the guiding through can take place in the same direction or substantially the same direction as the feeding, so that no change or substantially no change of the course of movement is required between the feeding and the guiding through. Ideally the stem is guided through the picking gap while oriented axis-parallel to the latter. Since in reality the plants to be harvested do not generally grow ideally straight and the fruit or fruits can be located at different places on the stem, the stem during the guiding through the picking gap can be inclined with respect to the latter. In spite of this inclination, the picking arrangement according to the invention can achieve a higher harvesting speed than can the row unit according to DE 196 22 719 A1, since the stem is not fed in one course of movement to the picking gap and then drawn through the picking gap in a course of movement substantially perpendicular to the first course of movement. In particular, the movement of the feeding and/or preferably also of the movement of the guiding through take place parallel or substantially parallel to the ground.

Since the plant to be harvested is, as a rule, aligned vertically or substantially vertically to the ground, it is preferred that the picking gap be oriented with its longitudinal axis vertical or substantially vertical to the ground. In this way a short structure is possible.

Preferably at least one carrier is movably guided on the support, by means of which carrier the stem can be grasped and fed to the picking gap. Through this means, the stem can be fed by the carrier to the picking gap with the stem having its longitudinal axis parallel or substantially parallel to the longitudinal axis of the picking gap. Furthermore, the stem can be guided by means of the carrier through the picking gap while the fruit is separated, so that the same carrier can guide the stem toward the picking gap and through the picking gap.

The carrier can, for example, be attached to a chain that is movable guided on the support. Preferably, however, the carrier is attached to a picking roller supported rotatably on the support, whose rotational axis, in particular, is oriented parallel to the longitudinal axis of the picking gap. In this way the picking roller, as seen from the movement direction of the picking arrangement, can be arranged, in particular, next to or in front of the picking gap. The carrier preferably extends radially to the rotational axis of the picking roller, wherein the distance between a radial outer end or end region of the carrier can be greater than or equal to the distance between the rotational axis of the picking roller and the picking gap. The carrier is preferably arranged at an end or end region of the picking roller facing the ground and, in particular, can rotate beneath the picking gap. The carrier is preferably arranged axially displaced with respect the picking gap, so that it cannot bump against the edges of the picking gap. The picking roller can be designed as conical or cylindrical. Furthermore, the picking gap can be designed as completely or sectionally spiraled and can run at least partially around the picking roller. The longitudinal axis of the picking gap can thus extend in the direction of the rotational axis of the picking roller and partially around the latter.

In addition to the carrier, the picking roller can exhibit several conveying elements, which, in particular, are arranged on the picking roller at a distance from each other along the rotational axis of the picking roller, whereby a stem or part thereof that is located in the picking gap or has already been guided through the picking gap can be conveyed away from the picking gap by means of the conveying elements. In addition, the guiding of the stem through the picking gap is assisted by the conveying elements. The conveying elements can comprise serrated discs and/or fins that are arranged in particular between the serrated discs. The fins preferably extend radially or substantially radially toward the rotational axis of the picking roller. In addition, the fins can be arranged all around the rotational axis of the picking roller.

Attached to the picking roller can be at least one elastic finger that extends radially or approximately radially away from the picking roller for a distance that is greater than the distance between the picking roller and the picking gap. Preferably, the elastic finger is here fixed to one of the conveying elements. Furthermore, several of these fingers can be provided. The finger or fingers facilitate the acceptance of the plants over the entire length. In this, the elastic finger can bend in an elastic or springy manner at the picking gap or the picking gap edge and is fabricated for this purpose from a suitable elastic material.

Several segments can be arranged in a ring-like manner on the picking roller and attached via plug connections. Here, the conveying elements exhibit in particular the segments or are formed by these. Preferably, each of these segments exhibits a back and, in particular, two legs running transversely or diagonally to the back, of which at least one or both are provided with teeth at the radially outer edge. Each segment can be designed in U-shaped manner. In addition, it is possible that the back is radially lengthened with respect to the legs and forms a ripping edge. Along the rotational axis of the picking roller, several such ring arrangements of segments can be provided such that they displaced from each other. The plug connections are preferably a matter of releasable plug connections, so that the segments can be exchanged. In particular, the plug connections exhibit feet, by which they are plugged into slits that are provided in the wall of the picking roller designed preferably as a pipe. The plug feet here are angled and grasp behind the pipe wall.

In particular, the picking roller stands upright, in other words the rotational axis of the picking roller is in particular oriented vertically or substantially vertically to the ground.

In addition to the picking roller, at least one auxiliary roller can be rotatably supported on the support, the auxiliary roller having its rotational axis, in particular, aligned parallel to the longitudinal axis of the picking gap and/or to the rotational axis of the picking roller, wherein several conveying elements can be arranged at a distance from each other on the auxiliary roller, by means of which elements the stems or stem parts guided through the picking gap can be conveyed away from picking gap.

The conveying elements of the auxiliary roller can include fins, which, in particular, extend radially or substantially radially to the rotational axis of the auxiliary roller. The fins of the auxiliary roller can, in particular, convey away from the picking gap a stem or stem parts guided through the picking gap. In addition, the guiding of a stem or stem parts through the picking gap can be assisted by the fins of the auxiliary roller. Preferably, the fins of the auxiliary roller can mesh with the intermediate space between the fins of the picking roller and/or the converse, so that the picking roller and the auxiliary roller can cooperate in the conveying away of a stem or stem parts guided through the picking gap.

Projections designed as ripping edges can be arranged on or fixed to the picking roller between the fins of the picking roller, on which projections the stem or stem parts guided through the picking gap can be ripped up. This ripping up is helpful in accelerating the decaying of the stem or stem part. The ripping is preferably supported in that the picking roller and the auxiliary roller are rotatable or are rotated at different circumferential speeds relative to each other. Furthermore, it is possible to provide ripping edges on the auxiliary roller.

As a complement or alternative to the ripping edges, several splitting elements can be attached, displaced from one another, on the support along an axis that is, in particular, parallel to the longitudinal axis of the picking gap and/or to the rotational axis of the picking roller, wherein the stem or stem part can be guided through between the splitting elements and picking roller and in the process be split up. By means of this embodiment of the picking arrangement according to the invention, it is likewise possible to accelerate the decaying process of the stem or stem parts.

The picking roller can exhibit one or several picking strips that are continuous or in each case divided into several pieces, which strips extend, for example, parallel to the rotational axis of the picking roller or run in the direction of the rotational axis of the picking roller in a spiral-like manner around the rotational axis of the picking roller. The picking strip or strips are here preferably formed through fins, in particular through their radially outer end regions or edges.

The stem can be fed by means of the carrier to the picking gap and/or can be guided through the latter without separation from the root. Preferably, however, supported at one of the ends or end region facing the ground, of the picking roller is least one separator knife, by means of which the stem can be separated from the root. Though this means, the feeding to and/or the guiding through of the stem via the picking roller is facilitated. Furthermore, the residual stubble can be kept as short as possible. A gearing can be planned between the picking roller and the separator knife, so that the separator knife can exhibit a different speed from the picking roller. The separator knife can rotate in the same or in the opposite direction of the picking roller and, according to the amount, can for example exhibit a speed greater than that of the picking roller. Alternatively, at least one separator knife can be rigidly fixed to the support, against which knife the stem can be guided by the carrier and thus separated from the root of the plant. This separator knife can be designed as serrated and/or as a disc. Furthermore, the carrier can exhibit or form at least one bent or curved finger with a cutting edge. When a stem is grasped by the finger, the stem can be guided against the cutting edge of the separator knife and, in cooperation with the cutting edge of the finger, be cut off in the manner of a shearing. After it is cut off, the stem can be guided in the direction of the picking gap by means of the finger and in the process rises up, in particular on the separator knife.

At one end or end region, facing away from the ground, of the picking roller a comminutor can be provided, by means of which comminutor an upper region or part of the stem can be comminuted. The comminutor can exhibit several serrated blades, the upper part of the stem being guided, for example, between the comminutor and the support, in particular though a gap provided between the comminutor and the support, and thus can be comminuted.

Attached to the support can be at least one divider spike and/or a curved guide that partially surrounds the picking roller, along which guide the stem can be guided by means of the carrier in the direction of the picking gap. The divider spike and/or the curved guide are arranged in particular in a region of the support facing the ground or in close spatial vicinity of the lower end or end region of the picking roller.

The carrier can be fixedly attached to the picking roller and can be unadjustable. Preferably, however, the carrier is detachably and exchangeably fastened to the picking roller and/or is designed to be variable in its shape, so that it can be adapted to different plants. The carrier can be designed as a star, which exhibits several fingers all around the periphery of the picking roller, which fingers extend radially away from the roller. Each of these fingers, as already described above, can be of a bent design and be provided with a cutting edge.

Between the picking roller and the picking gap at least one carrier guide can be fixed to the support, wherein the stem can be guided by means of the carrier along the carrier guide in the direction of the picking gap. The carrier guide ensures in particular that the stem moves on a defined course during the feeding to the picking gap.

Arranged at a distance from one another along an axis oriented, in particular, parallel to the longitudinal axis of the picking gap and/or to the rotational axis of the picking roller are preferably several chopping knives, by means of which the stem can be cut up into multiple pieces. The serrated cutters can, for example, be attached fixedly to the support or can be attached to a chopping roller mounted rotatably on the support, the rotational axis of the chopping roller being in particular oriented parallel to the longitudinal axis of the picking gap and/or to the rotational axis of the picking roller. Furthermore, it is possible to support the chopping knives on the picking roller, on the auxiliary roller and/or on another roller. Since the chopping knives can wear out, they are attached, in particular, exchangeably to the support, to the chopping roller, to the picking roller, to the auxiliary roller and/or to the other cylinder. The chopping knives and the serrated discs, serving as the transport elements, of the picking roller are arranged, in particular, axially displaced from one another and can at least partially overlap each other. In this context, it has proven advantageous when the chopping knives rest against the serrated blades and/or are prestressed against these. The chopped stem remnants or plant remnants are preferably guided away horizontally, in particular, toward the side, toward the front and/and toward the rear. The chopping knives or the chopping knife arrangement can also be used or applied independently of the invention or independently of the orientation of the picking gap according to the invention. In this case the orientation of the axis or chopping roller, along which the chopping knives are arranged at a distance from each other, is independent of the orientation of the picking gap; in particular, the picking gap can be oriented arbitrarily. Furthermore, the picking roller can be replaced by an arbitrary or additional cylinder with appropriate arrangement of the chopping knives.

Rotatably mounted to the support is preferably at least one intake roller, whose axis of rotation is oriented, in particular, parallel to the longitudinal axis of the picking gap and/or to the rotational axis of the picking roller, wherein at least one intake element extending radially away from the axis of rotation of the intake roller is attached to the intake roller in rotationally-fixed manner. By means of the intake roller, it is possible to feed the stem to the carrier, in particular, when the plant is arranged outside the grasping range of the carrier. Through the intake roller the range of the plants that can be fed to the carrier is increased. Furthermore, the chopping roller can be formed by the intake roller.

The intake roller can exhibit a second intake element extending radially away from the rotational axis of the intake roller, the intake element being connected to the intake roller in a rotationally fixed manner. The two intake elements exhibit preferably a distance between them, wherein provision can be made for at least one intermediate element between the two intake elements, the intermediate element extending radially away from the rotational axis of the intake roller and being fixed to the intake roller.

The intake roller can exhibit above the intake element a frustum-shaped region, whose diameter increases downward, i.e. with decreasing distance to the intake element. Along the frustum-shaped region, a fruit separated from the stem can be guided into radially outward regions of the intake element. The frustum-shaped region is formed, in particular, in the lower region of the intake roller and can border on the intake element.

By means of the intake element, the stem can be fed to the carrier without separation from the root. It is preferable, however, to make provision for a separator blade, by means of which the stem can be separated from the root of the plant during the feeding. Through this, the feeding of the stems by means of the intake roller is facilitated. Furthermore, the residual stubble can be kept as short as possible. The separator blade can be fixed to an end or end region, facing the ground, of the intake roller. A gearing can be provided here between the intake roller and the separator blade, so that the latter can exhibit a different speed from the intake roller. The separator blade can turn in the same or opposite rotational direction as that of the intake roller and, according to the amount, can for example turn at a greater speed than the intake roller. As an alternative or complement it is possible to attach at least one separator blade rigidly to the support, wherein the stem can be guided against the separator blade by means of the intake element of the intake roller and can be separated from the root of the plant. This separator blade can be designed as serrated and/or disc shaped. Further, the intake element can exhibit or form at least one bent or curved finger with a cutting edge. If a stem is grasped by the finger, then the stem is guided against the cutting edge of the separator blade and, in cooperation with the cutting edge of the finger, is cut off in the manner of a shearing. After it is cut off, the stem can be guided by means of the finger in the direction of the picking roller and in the process rises up, in particular on the separator knife.

To the support can be attached at least one divider spike and/or at least one curved guide that partially surrounds the intake roller, wherein the stem can be guided by means of the intake elements along the curved guide in the direction of the carrier. The divider spike, starting from the support, extends, in particular, forward in the movement direction of the picking arrangement, so that plants arranged on the side of the divider spike facing away from the carrier can also be guided by the intake element to the carrier.

The intake element can be fixedly attached to the intake roller and can be unadjustable. It is preferable, however, to fasten the intake element to the intake roller so that it is detachable and exchangeable and/or to design the intake element so that it is variable in its form, especially with regard to its length, so that it can be made suitable to different plants. The intake element can be designed as a star that exhibits several fingers all around the intake roller, which fingers extend radially away from the cylinder. Each of these fingers, as already described above, can be curved and provided with a cutting blade.

Between the intake roller and the picking roller or the picking gap, at least one intake guide can be fastened to the support, wherein, by means of the intake element, the stem can be guided along the intake guide in the direction of the carrier. The intake guide ensures, in particular, that the stem moves on a defined course during the feeding to the carrier. Preferably, the intake guide transitions into the carrier guide or is formed as a single piece with the latter.

In addition, in the region between the intake roller and the picking roller at lease one guide plate can be attached to the support. The guide plate is preferably inclined upward in a direction from the intake roller to the picking roller and extends in particular in a curved manner around the picking roller to the picking gap. By means of the guide plate, a fruit separated from the stem can be led away from the picking gap. Viewed in the longitudinal direction of the picking gap, several such guide plates can be fastened to the support at a distance from one another.

The carrier and the intake element can be arranged so as to be axially displaced with respect to each other. In particular, the sum of the distance between a radially outer end of the carrier and the rotational axis of the picking roller and the distance between a radially outer end of the intake element and the rotational axis of the intake roller is greater than or equal to the distance between the rotational axis of the picking roller and the rotational axis of the intake roller, so that the carrier and the intake element can overlap. Prevented through this means is the forming of a region between the intake element and the carrier in which a stem located there cannot be grasped.

The movement of the picking arrangement along the ground can have the consequence that, with regard to the harvesting speed, an orientation of the picking gap that deviates from the ideal vertical orientation of the picking gap relative to the ground is optimal. For this reason, it is possible to incline the picking gap with respect to the vertical orientation, in particular in or against the direction of movement, either together with the support or relative to the latter. The inclined picking gap can have an angle to a vertical to the ground of up to +/−45°, especially of up to +/−15°. Preferably, however, the inclination should not exceed an angle of 30° forward, that is, in the direction of movement of the picking arrangement, and an angle of 15° rearward, that is, opposite to the direction of movement. If the picking gap is considered with its longitudinal axis as essentially still vertical to the ground, then the longitudinal axis of the picking gap can be split into two components, wherein a first component is oriented vertically to the ground and the second component is oriented parallel to the ground. The amount of the first component is then preferably greater than the amount of the second component. The second component is here oriented in particular parallel to the direction of movement or lies on a straight line with the latter.

To the support, in particular above the picking gap, the intake roller and/or the picking roller, can be attached a plant guide preferably displaying a pipe, by means of which plant guide the stem can be inclined, in particular inclined away from the picking gap. The inclination preferably takes place in the movement direction of the picking arrangement. Furthermore, it is possible to lead away an upper remainder piece of the plant toward the rear above the picking arrangement, that is, opposite to the movement direction of the picking arrangement.

Preferably, at least one second carrier is removably guided on the support, wherein the stem with its longitudinal axis oriented parallel to or substantially parallel to the longitudinal axis of the picking gap can be fed the picking gap by both carriers, the carriers being arranged at a distance from one another. Through this means, it is ensured that even in the case of relatively long and/or bendable plant stems a secure feeding to the picking gap is possible. In addition, in particular by means of these two carriers, the stem is also guided through the picking gap, which at least during the guiding through can extend between the two carriers. The carriers are here preferably fastened to opposite-lying ends or end regions of the picking roller, wherein in particular an upper of the two carriers can sweep over the picking gap and a lower of the two carriers can sweep under the picking gap. For grasping of the stem on both sides or for the grasping of the stem by both carriers, it can be advantageous to incline the picking gap and/or the picking roller with respect to an axis aligned with a vertical to the ground, in the direction of movement of the picking arrangement.

The picking arrangement is attached by means of the support preferably to a vehicle, in particular a motor vehicle that, for example, can be formed by a tractor or a combine. The direction of movement of the picking arrangement in this case coincides in particular with the traveling direction of the vehicle.

If the stem is separated from the plant remnants by a separator blade, there remains residual stubble sitting in the ground. Thus, on the support can be arranged a rotatable distribution mallet, by means of which the residual stubble can be comminuted. Furthermore, the chopped up plant remnants can be purposely distributed by means of the distribution mallet.

The picking gap is preferably open on both sides with reference to its longitudinal direction. Furthermore, the edges of the picking gap are preferably formed of, in particular, oblong-designed side elements, for example sheet metal plates, that are attached to the support and have a longitudinal axis that runs preferably parallel to the longitudinal axis of the picking gap. However, it is also possible to have the support itself form the edges of the picking gap. In addition, the picking gap can be formed between two rollers, in particular between the picking roller and the auxiliary roller. Preferably, the picking gap is arranged in the wedge or wedge-shaped space formed between the picking roller and the auxiliary roller.

According to a variant, one of the edges of the picking gap is formed by the picking roller and the other edge of the picking gap is formed by the support or from a side element attached to the support. In this case the picking roller can be designed specially, in particular degressively, so that the stem, but not the fruit, can penetrate into the intermediate space between the conveying elements of the picking roller. As seen from the movement direction or traveling direction, the front edge of the picking gap is formed in particular by the picking roller.

The edges of the picking gap or the side elements are preferably arranged one behind the other as seen in or substantially in the movement direction. Furthermore, one of the side elements of the picking gap can be fastened to at least one edge support connected to the support, which edge support extends through an opening provided in the picking roller, the opening being designed in particular as a slit.

The width of the picking gap is, in particular, greater than the diameter of the plant stem, so that the latter can be guided through the picking gap. Furthermore, the width of the picking gap is preferably narrower than the diameter or the largest diameter of the fruit to be harvested, so that the fruit cannot pass through the picking gap but rather comes to rest against the edges of the latter and is separated or stripped from the stem guided through the picking gap. The fruit then falls in the direction of the ground due to its weight, and can be collected and then fed into a hopper that, for example, is attached to the support. However, the fruit can also be collected directly by the hopper, which preferably extends to a point underneath the picking gap.

The picking arrangement according to the invention is suited especially for the harvesting of plants that exhibit an elongate stem, on which the fruit or fruits are situated above the ground. Preferably, the plants are matter of corn plants or sunflowers, so that the fruit is formed, for example, by a corn cob or by a flowering head (inflorescence) of a sunflower. The width of the picking gap is preferably variable or adjustable, in particular is adaptable to the fruit to be harvested or the prevailing conditions.

The invention further relates to a picking attachment or a row arrangement having a frame and several picking arrangements according to the invention, wherein the supports of the picking arrangements can be placed together on the frame or be formed by the latter. The picking arrangements of the picking attachment (row arrangement) can here be further developed according to all previously mentioned embodiments. The picking attachment (row arrangement) offers the possibility of harvesting a larger area, with the picking arrangements being arranged in particular next to each other on the frame, preferably transversely to the direction of movement. The picking attachment (row arrangement) can thus as a whole exhibit a width that is cumbersome for transport or for travel on public roads, so that the frame preferably exhibits several frame parts that are swingably connected to each other, which frame parts can be folded. As an alternative, the frame can also be disassembled into several parts or separated as a whole from the vehicle.

With the picking attachment (row arrangement) according to the invention, a very large active region is present in comparison to conventional solutions, so that in particular a non-row based acceptance of plant stems is possible. The active region should be formed here by a region in which a stem can be grasped by one of the carriers and/or by one of the intake elements and fed indirectly or directly to the picking gap. According to the invention, there are no or only very small non-grasping regions, which are in particular negligibly small. With the conventional picking attachments, by contrast, between two active regions is formed an inactive region that can be wider than the active regions. Thus, in order to still be able to grasp the stems cleanly, with the conventional picking attachments the traveling direction is oriented in the direction of the rows of the plants to be harvested. Furthermore, conventional picking attachments are adapted to the usual row widths of the plants to be harvested, so that these picking attachments cannot be used or can be used only in a restricted way for other row widths. These restrictions do not exist for the picking attachment (row arrangement) according to the invention.

The invention further comprises the use of the picking arrangement according to the invention for the picking of at least one fruit situated on an elongate stem of a plant, wherein the plant is, in particular, a corn plant or a sunflower. In this context, the picking arrangement can be further developed according to all previously mentioned embodiments.

In addition, the invention relates to a method for the picking of at least one fruit situated on an elongate stem of a plant, wherein the stem is fed to an elongate picking gap bordered by lateral edges and then the fruit is separated at the edges from the stem as the stem is guided through the picking gap, the stem being fed to the picking gap with its longitudinal axis parallel or substantially parallel to the longitudinal axis of the picking gap.

Preferably, the stem is fed to the picking gap with its longitudinal axis oriented vertically or substantially vertically to the ground. Furthermore, the stem can be guided through the picking gap with its longitudinal axis oriented parallel or substantially parallel to the longitudinal axis of the picking gap.

The method is carried out in particular through use of the picking arrangement according to the invention and/or through the use of the picking attachment (row arrangement) according to the invention.

BRIEF DESCRIPTION OF THE DRAWINGS

In the following, the invention is described with the aid of preferred embodiment forms and with reference to the drawings. In the drawings.

DETAILED DESCRIPTION OF THE PREFERRED EMBODIMENT

Figure 1:
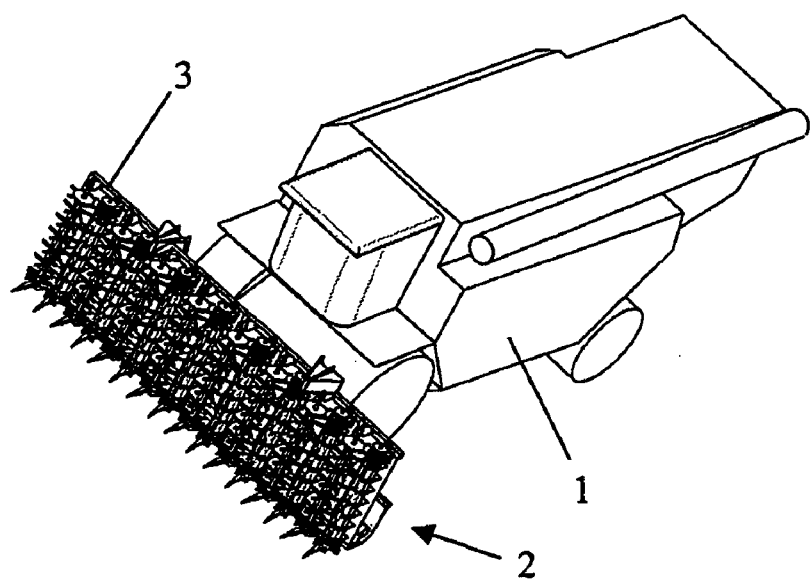
FIG. 1: shows a perspective view of a harvesting vehicle with a picking attachment according to a first embodiment form of the invention.
Figure 2:
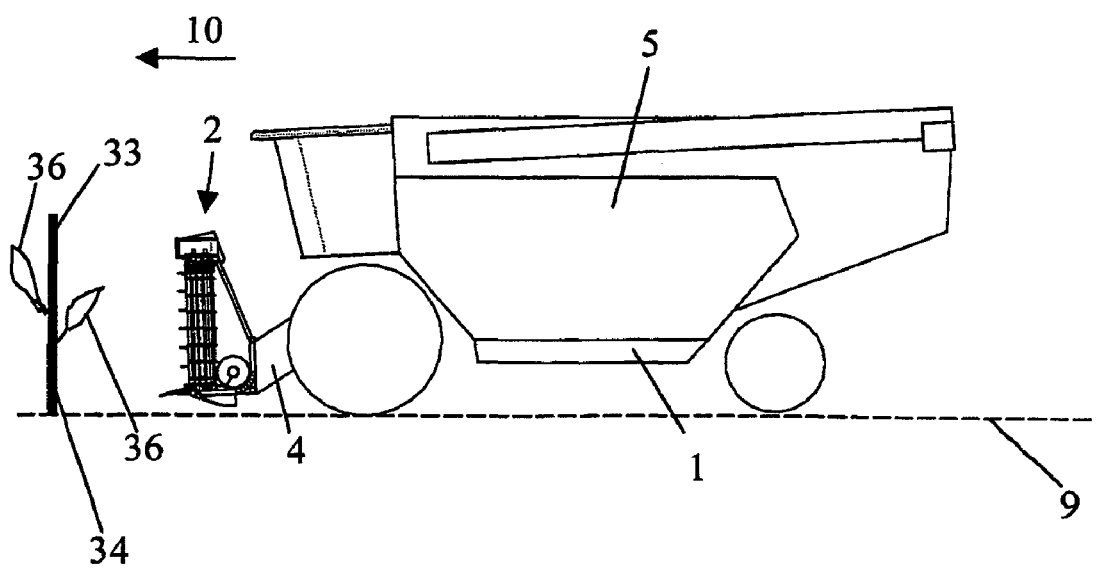
FIG. 2: shows a side view of the harvesting vehicle according to FIG. 1.

Shown in FIGS. 1 and 2 are different views of a harvesting vehicle 1 with a picking attachment 2 according to a first embodiment form of the invention, which attachment displays a frame or support 3 and is fastened to the harvesting vehicle 1 via the latter. The harvesting vehicle 1 displays an inclined conveyor 4 that extends toward the picking attachment 2, by means of which conveyor fruits picked by the picking attachment 2 can be fed to a collection container 5 arranged in the harvesting vehicle 1.

Figure 3:
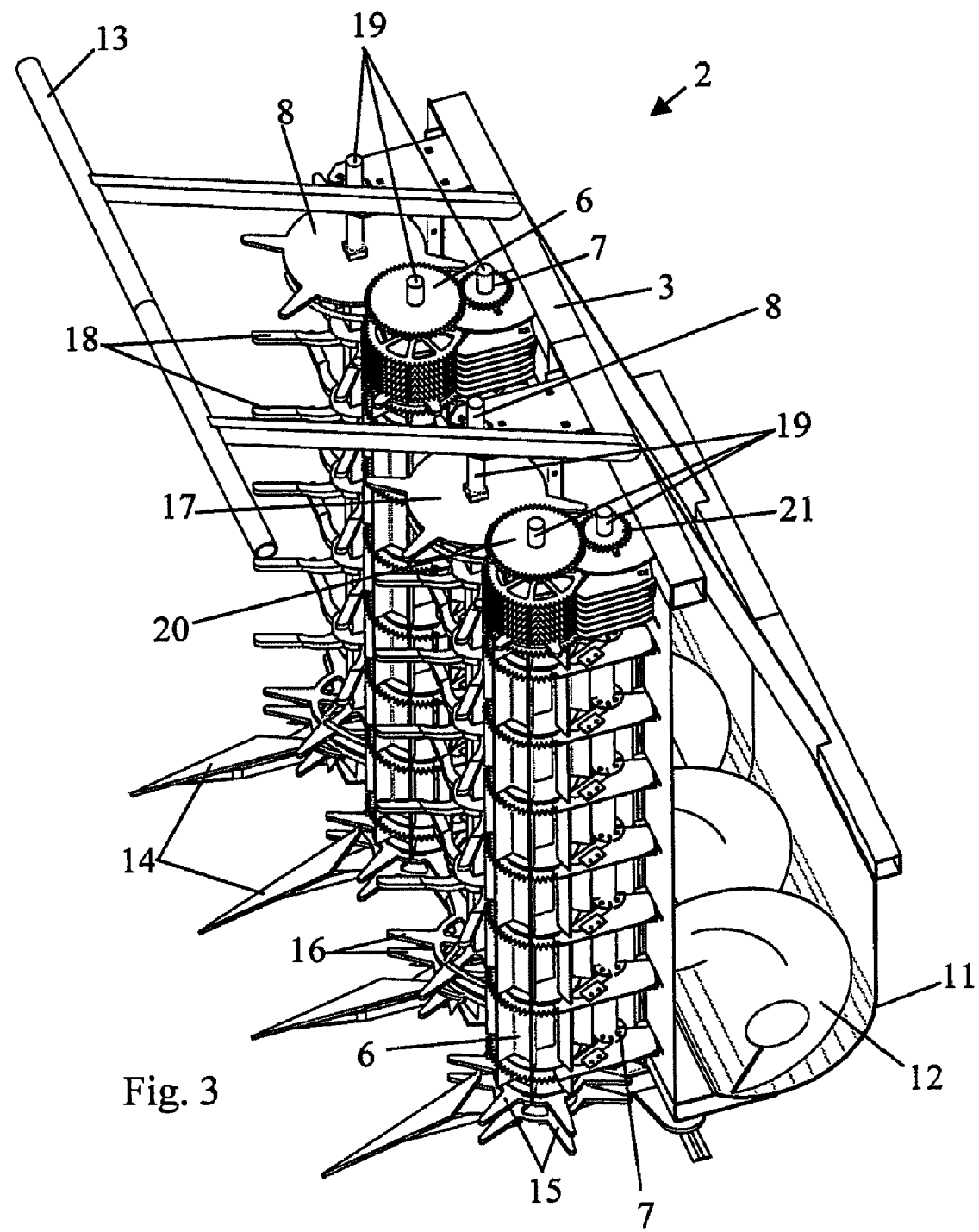
FIG. 3: shows a perspective partial view of the picking attachment according to FIG. 1.

Shown in FIG. 3 is a perspective partial view of the picking attachment 2, which displays several picking rollers 6, several auxiliary rollers 7 and several intake rollers 8, wherein the rollers 6, 7, and 8 are arranged on a side of the support 3 that faces away from harvesting vehicle 1 and are in each case rotatably mounted on the support 3. The rotational axes of the rollers 6, 7, and 8 run parallel to each other and, with respect to a straight line oriented vertically to the ground 9, are inclined slightly in the direction of travel 10 of the harvesting vehicle 1 (see FIG. 2). However, the inclination is slight, so that the rotational axes of the rollers 6, 7, and 8 are oriented substantially vertically with respect to the ground 9. In addition, a trough 11 is attached to the support 3, in which trough runs a screw conveyor 12, by means of which fruits 36 picked by the picking attachment 2 can be fed to the inclined conveyor 4, which then, if necessary with the interconnection of a threshing apparatus, transports the fruits into the collection container 5. A plant guide 13 can be fastened to the end of the support 3 facing away from the ground 9, by means of which guide at least the upper regions of the plants 34 bearing the fruits 36 can be inclined in the direction of travel 10. The plant guide 13 extends from the support 3 in a direction away from the harvesting vehicle 1 and its provision is merely optional, so that the plant guide 13 can also be omitted. In the region of the picking rollers 6 and the intake rollers 8, divider spikes 14 are attached to the support 3 in each case, which tips are situated in the region of the lower ends of these rollers 6, 8 and extend from the support 3 substantially in the direction of travel 10.

Each picking roller 6 displays at its lower end two star-shaped carriers 15, which are connected to the respective picking roller 6 in a rotationally-fixed manner. Further, each intake roller 8 displays at its lower end two star-shaped intake elements 16, which are connected to the respective intake roller 8 in a rotationally-fixed manner. In addition, each intake roller 8 displays at its upper end a star-shaped intake element 17, which is connected to the respective intake roller 8 in a rotationally-fixed manner. Provided on each intake roller 8 are several star-shaped intermediate elements 18 that are arranged at a distance from each other and are connected to the respective intake roller 8 in a rotationally-fixed manner. The rollers 6, 7, and 8 can be combined to form several picking arrangements 19 that are arranged side-by-side along the support 3 transversely to the direction of travel 10 and display in each case one of the picking rollers 6, one of the auxiliary rollers 7, and one of the intake rollers 8. Arranged on the upper end of each picking roller 6 is a spur wheel 20, which meshes with a spur wheel 21 that is arranged on the upper end of the auxiliary roller 7 of the associated picking arrangement 19. The spur wheels 20 and 21 are connected to the respective rollers 6 and 7 in a rotationally-fixed manner.

Figure 4:
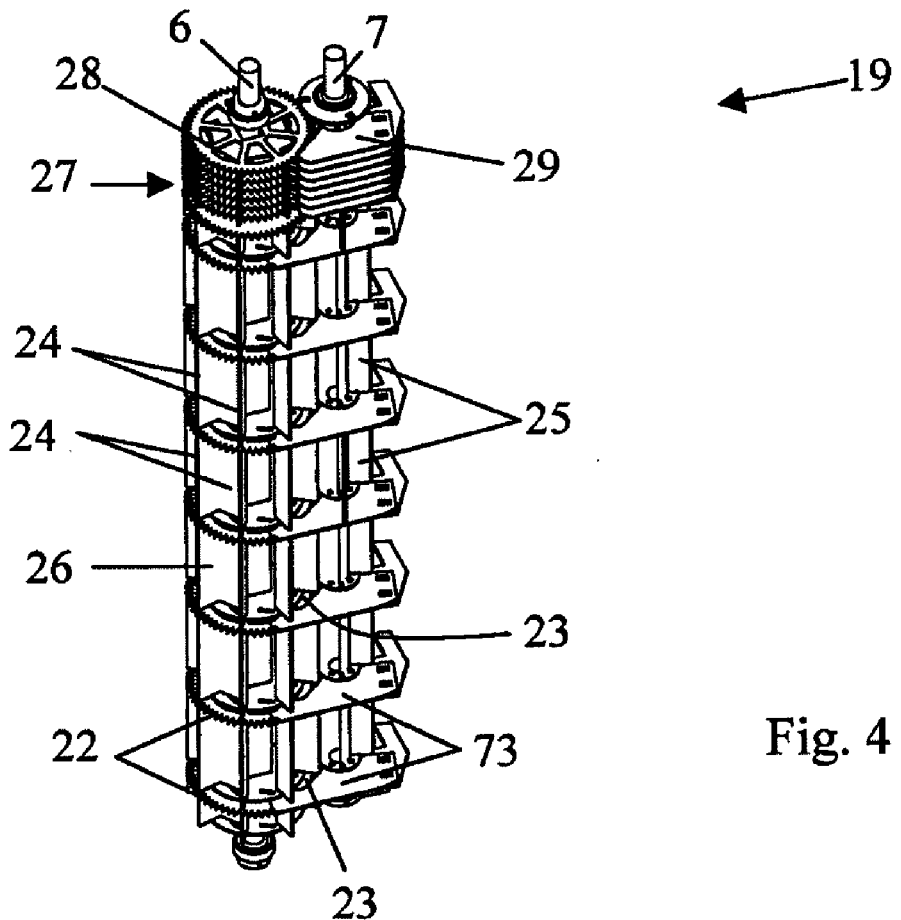
FIG. 4: shows a perspective view of a picking roller of the picking attachment according to FIG. 3.

Represented in FIG. 4 is a perspective partial representation of one of the picking arrangements 19 without the associated intake roller 8, wherein several serrated discs 22 are attached to the picking roller 6 and arranged at a distance from each other, against which discs several chopping knives 23 are pre-stressed, which chopping knives are attached to the support 3 and arranged at a distance from each other. In addition, between the serrated discs 22 several fins 24 are arranged all around the rotational axis of the picking roller 6. The auxiliary roller 7 likewise displays several fins 25 that can mesh with the intermediate spaces 26 formed between the fins 24. Further, provided on the upper end of the picking roller 6 is a comminutor 27 that displays several serrated discs 28 attached to the picking roller 6 and several knives 29 attached to the support 3, so that plant material transported by the serrated discs 28 to the knives 29 is comminuted between the serrated discs 28 and the knives 29.

Figure 5:
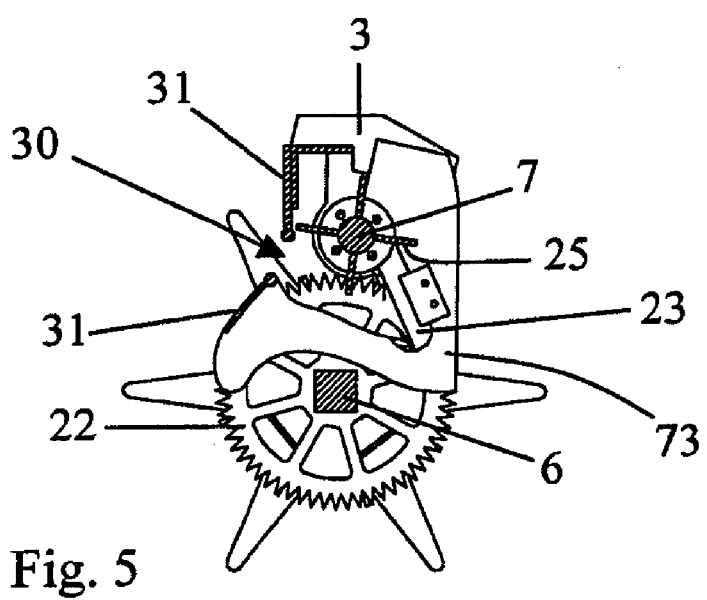
FIG. 5: shows a sectional view through the picking roller according to FIG. 4.

Shown in FIG. 5 is a sectional view of the arrangement represented in FIG. 4, wherein further represented is a picking gap 30 that is bounded laterally by side elements (plates) 31 that are attached to the support 3, which side elements thus form the lateral edges of the picking gap 30. The picking gap 30 has an elongated form, its longitudinal axis running parallel to the rotational axis of the picking roller 6. One of the side elements 31 of the picking gap 30 is attached to at least one edge support 73 that is connected to the support 3, which edge support extends through a slot provided in the picking roller 6 and overlaps one of the serrated discs 22.

Figure 6:
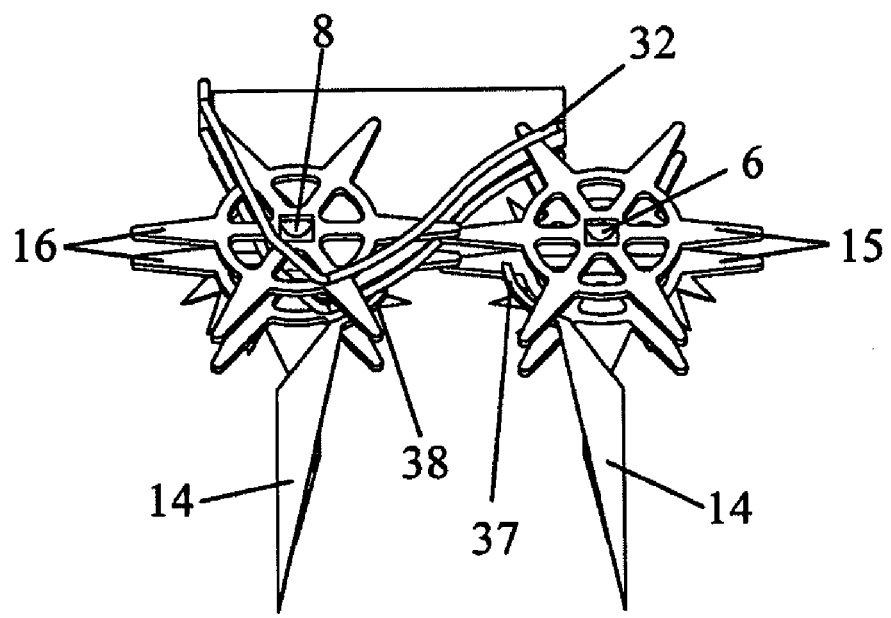
FIG. 6: shows a perspective representation of a carrier and an intake element according to FIG. 3.

Shown in FIG. 6 is a perspective representation of the carriers 15 and the intake elements 16, wherein an intake guide 32 is attached to the support 3 between the intake elements 16 or the intake roller 8 and the carriers 15 or the picking roller 6, along which intake guide a stem 33 (see FIG. 2) of the plant 34 grasped by the intake elements 16 can be fed to the carriers 15. The stem 33 can then be grasped by the carriers 15, fed along the intake guide 32 to the picking gap 30, and guided through the latter. The intake guide 32 thus forms at the same time a carrier guide. Since the width 35 (see FIG. 9) of the picking gap 30 is greater than the diameter of the plant stem 33, the latter can be guided through the picking gap 30. However, the width 35 of the picking gap 30 is smaller than the diameter (or greatest diameter) of the fruits 36, so that the latter cannot pass through the picking gap 30 but rather come to rest against the edges 31 and are separated from or ripped off of the stem 33 that is guided through the picking gap 30. The fruits 36 then fall from their own gravity in the direction of the ground 9, are collected, and then fed to the trough 11. However, the fruits can, in particular, also be collected directly by the trough 11, which preferably extends to a point underneath the picking gap.

From FIG. 6 it is apparent that the carriers 15 are arranged in an axially-displaced manner with respect to the intake elements 16, so that the carriers 15 can overlap with the intake elements 16. It is thus ensured that between the picking roller 6 and the intake roller 8 there exists no empty space in which a plant stem 33 can be grasped by neither the carriers 15 nor the intake elements 16.

Figure 7:
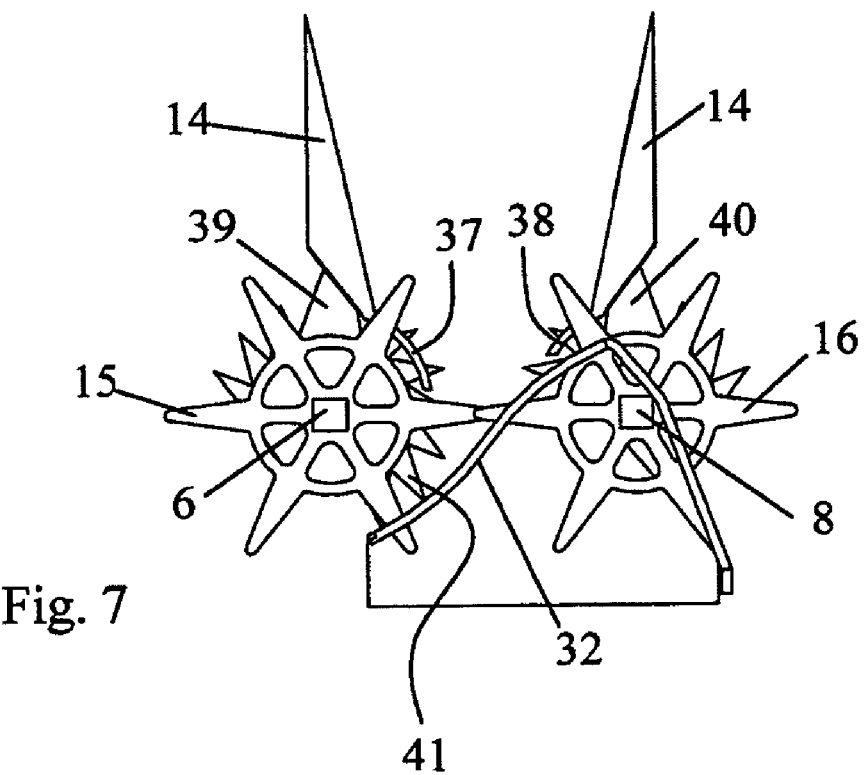
FIG. 7: shows a plan view of the arrangement according to FIG. 6.

FIG. 7 shows a plan view of the arrangement according to FIG. 6, wherein attached to the support 3 is a curved guide 37 that extends partially around the picking roller 6. In addition, attached to the support 3 is a curved guide 38 that extends partially around the intake roller 8, wherein the two curved guides 37, 38 are arranged in the region of the divider spikes 14, in particular are attached to the latter.

Figure 8:
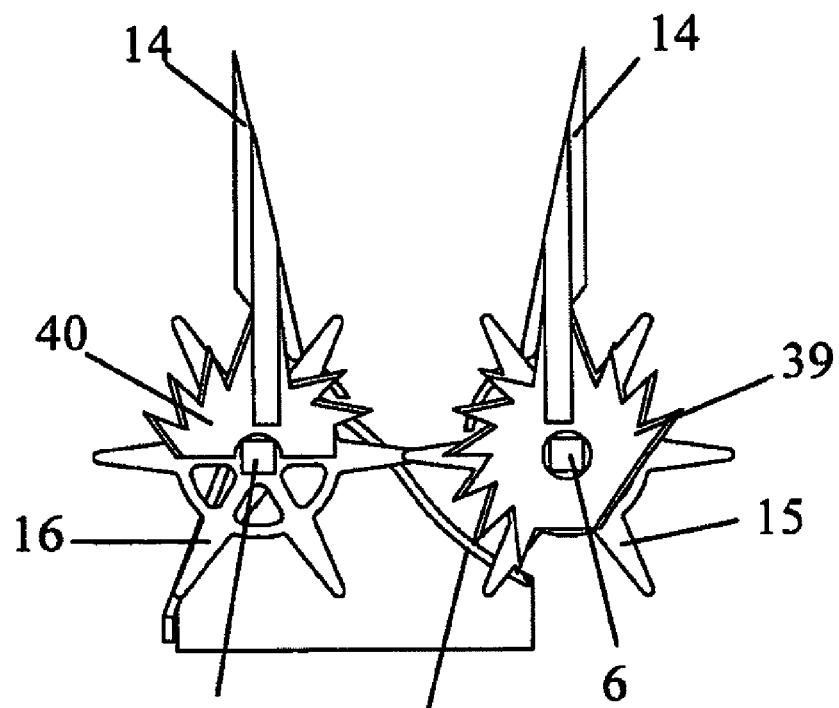
FIG. 8: shows a bottom view of the arrangement according to FIG. 6.

In addition, separator knives 39 and 40 are attached to the support underneath the picking roller 6 and underneath the intake roller 8, which fact is more clearly seen in FIG. 8, which shows a bottom view of the arrangement according to FIG. 6. A plant stem 33 that is arranged outside the intermediate space between the two divider spikes 14 or between the picking roller 6 and the intake roller 8 and is grasped by the carriers 15 can thus be guided against the knife 39, cut through by the latter, and then fed along the curved guide 37 to the picking gap 30. Further, A plant stem 33 that is arranged outside the intermediate space between the two divider spikes 14 or between the picking roller 6 and the intake roller 8 and is grasped by the intake elements 16 can be guided against the knife 40, cut through at the knife, and then guided along the curved guide 38 to the intake guide 32. Along the latter, the plant stem 33 is fed by the intake element 16 to the carrier 15, which grasps the plant stem 33 and feeds it along the intake guide 32 to the picking gap 30 and through the latter. The knives 39 and 40 display several blades, so that a plant stem 33 can be cut through at different positions along the periphery of the picking roller 6 or the intake roller 8. In particular, the knife 39 displays at least one knife blade 41 arranged in front of the picking gap 30 in the region of the intake guide 32, by means of which knife blade a plant stem 33 grasped by the carrier 15 can be cut through before it is guided through the picking gap 30.

Figure 9:
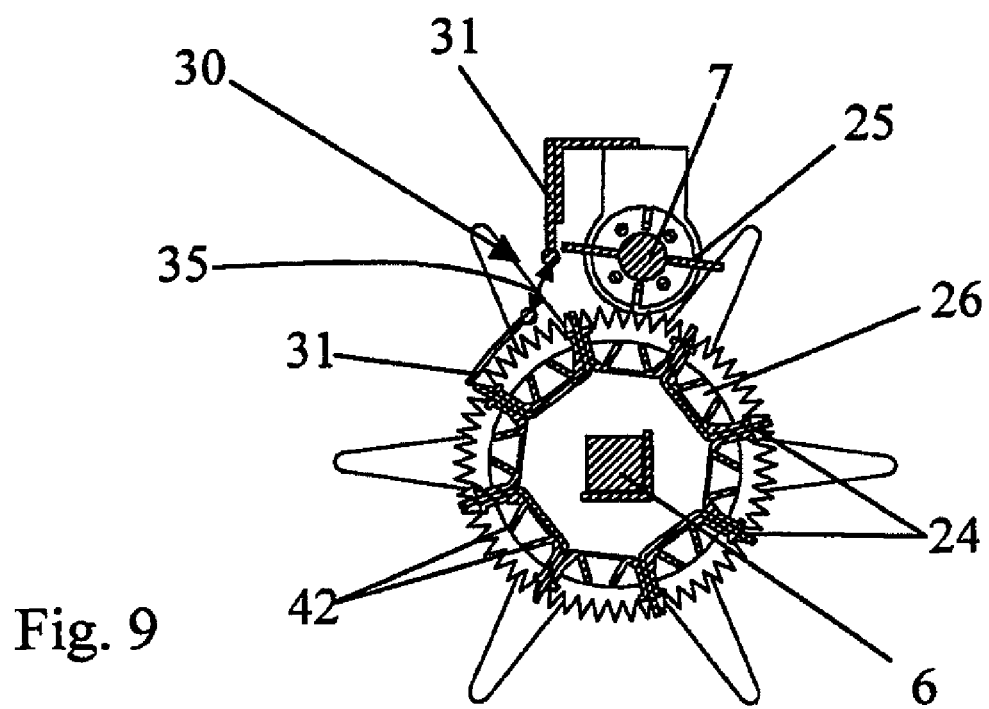
FIG. 9: shows another sectional view through the picking roller according to FIG. 4.

Shown in FIG. 9 is another cross section through the picking arrangement 19 according to FIG. 4, wherein arranged between the fins 24 placed all around rotational axis of the picking roller 6, that is to say arranged in the intermediate spaces 26, are several projections 42 designed as ripping edges. A plant stem 30 or part thereof guided through the picking gap 30 is grasped by the fins 25, guided into the intermediate space 26, brought into contact with the ripping edges 42, and guided past the ripping edges 42. In the process, the stem 33 or the stem part is torn up, whereby the rotting process of the stem 33 or the stem part can be accelerated. The ripping up is further aided in that the fins 25 display a different peripheral velocity than do the fins 24. Preferably, the peripheral velocity of the fins 25 is, according to amount, twice as great as the peripheral velocity of the fins 24.

In addition, the stem 33 is chopped up by the chopping knives 23 into multiple parts, after which the chopped-up and ripped-up stems 33 or stem parts are ejected, in particular in the direction of travel and/or transversely to the latter.

Figure 10:
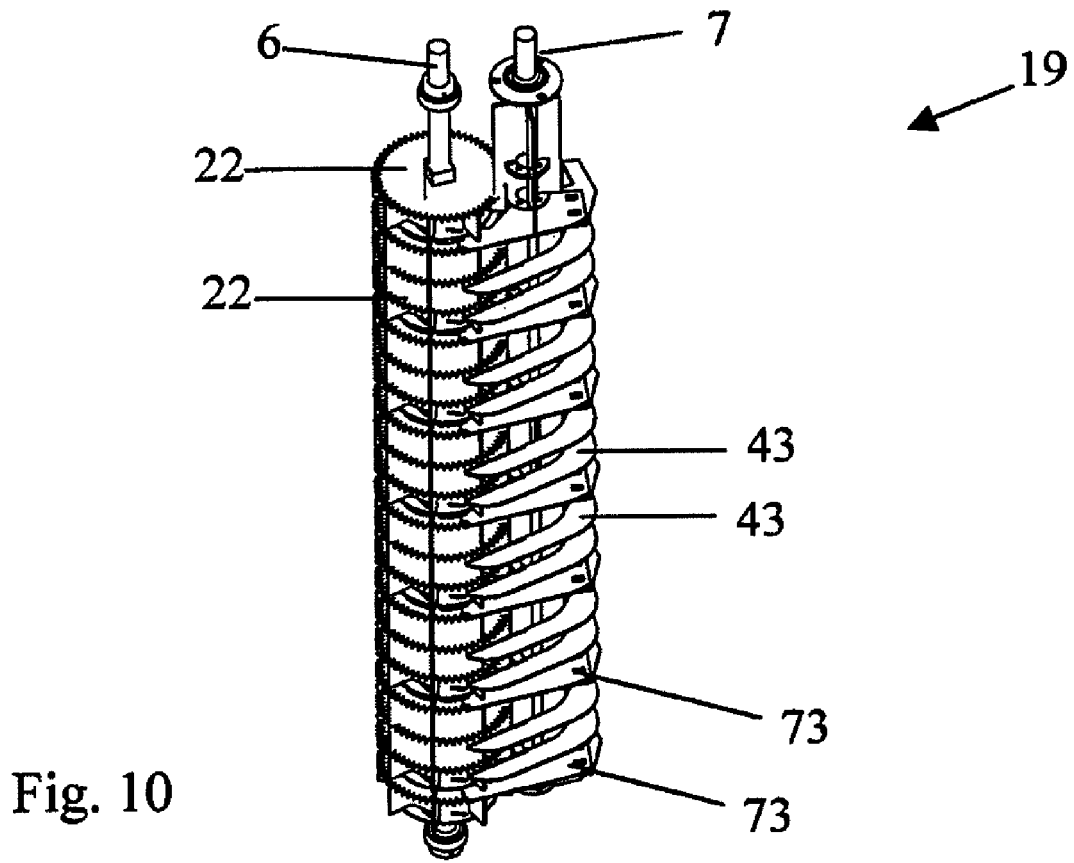
FIG. 10: shows a picking roller arrangement according to a second embodiment form of the invention.
Figure 11:
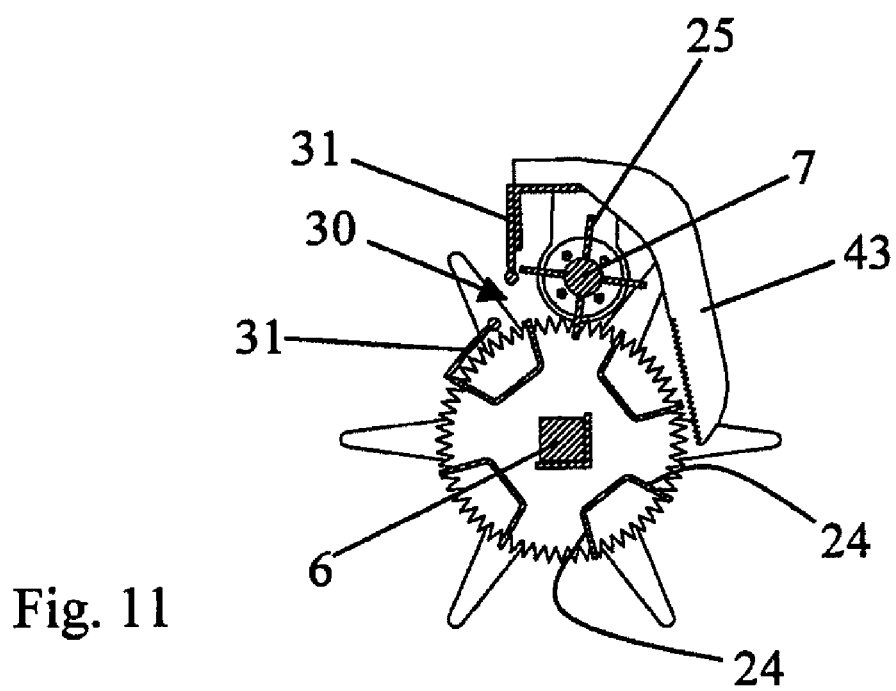
FIG. 11: shows a sectional view through the picking roller arrangement according to FIG. 10.

Shown in FIG. 10 is a perspective partial representation of a picking arrangement 19 according to second embodiment form, in which features that are identical or similar to those in the first embodiment form are labeled with the same reference numerals as in the first embodiment form. The second embodiment form corresponds substantially to the first embodiment form, but, in addition to the features of the first embodiment form, several splitting elements 43 are attached to the support 3 at a distance from each other, whereby the stems 33 or parts thereof led through the picking gap 30 can be guided against the splitting elements 43 and split up there. In this case, the ripping edges 42 can be dispensed with, which can be seen in FIG. 11, which shows a sectional view through the arrangement according to FIG. 10.

Figure 12:
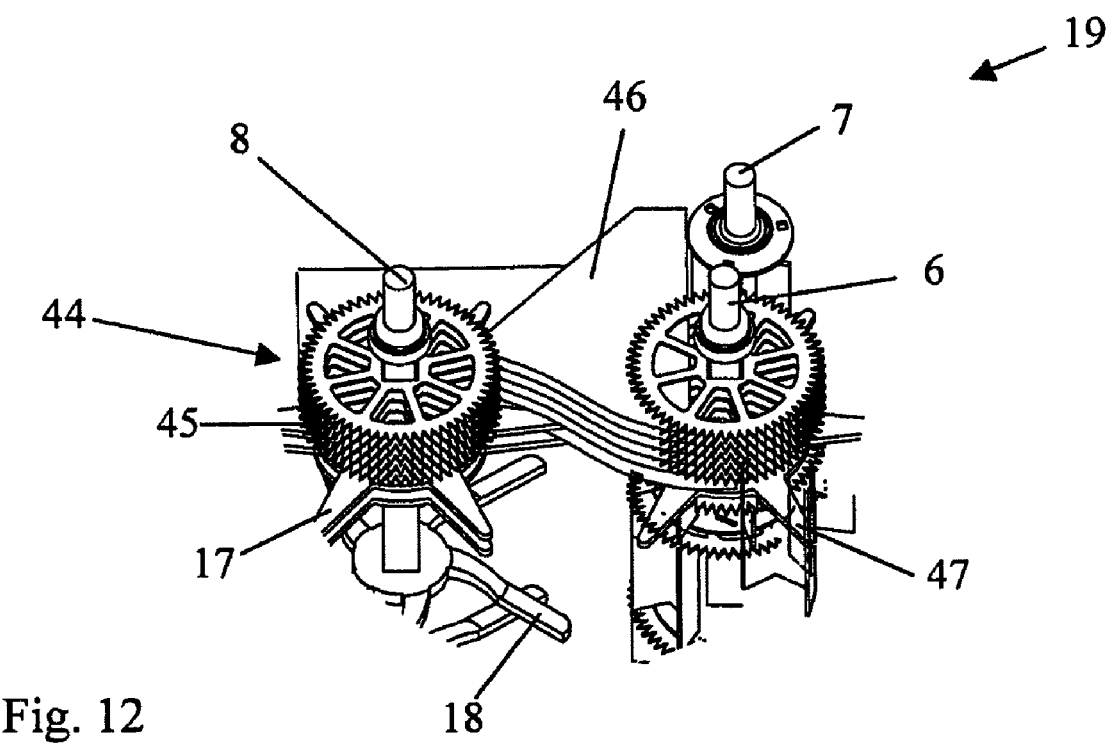
FIG. 12: shows a perspective partial view of a picking roller arrangement according to a third embodiment form of the invention.

Shown in FIG. 12 is a perspective partial view of a picking arrangement 19 according to a third embodiment form of the invention, in which features that are identical or similar to those in the first embodiment form are labeled with the same reference numerals as in the first embodiment form. The third embodiment form differs from the first embodiment form in particular through the fact that arranged at the upper end of the intake roller 8 is a comminutor 44, which displays several serrated discs 45 attached in a rotationally-fixed manner to the intake roller 8 and a guide element 46 attached to the support 3. Arranged in the upper region of the picking roller 6 and rotationally-fixed with the latter is a second carrier 47, by means of which the upper region of the stem 33 can be fed to the serrated discs 45 along the guide element 46 and then comminuted between the serrated discs 45 and the guide element 46. The guide element 46 meshes with the intermediate spaces formed between the serrated discs 45. In addition, the second carrier 47 is connected to the picking roller 6 in a rotationally-fixed manner.

Figure 13:
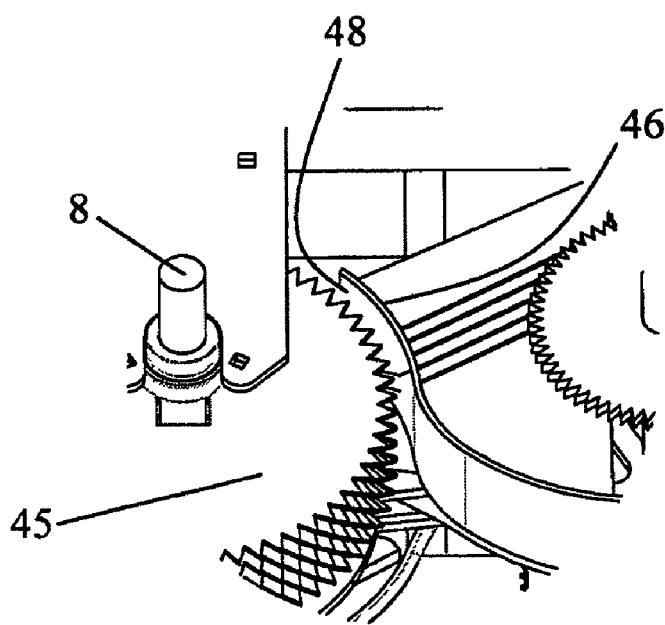
FIG. 13: shows a variant of the arrangement according to FIG. 12.

According to a variant of the third embodiment form shown in FIG. 13, it is possible to design a gap 48 between the guide element 46 and the serrated discs 45, through which gap the upper part of the stem 33 can be guided and in the process comminuted. In particular, it is possible to provide several projections in the gap 48, arranged at a distance from each other, which projections mesh with the intermediate space between the serrated discs 45.

Although the carrier 47 according to this embodiment form has already been explained in connection with the comminutor 44, nevertheless it is possible, as well in the case of all other embodiment forms of the invention, to provide in the upper end region of the picking roller 6 a second carrier 47 that is connected to the picking roller in a rotationally-fixed manner. In particular, the second carrier 47 can, in the case of a long stem 33, serve the additional guidance of the latter and can be provided regardless of whether a comminutor 44 is present. It is further possible to attach to the support 3 a second intake guide and/or a second carrier guide, which is arranged between the intake roller 8 and the picking roller 6 and is situated in the upper region of the intake roller 8 and the picking roller 6 at a distance from the (lower) intake guide 32.

Figure 14:
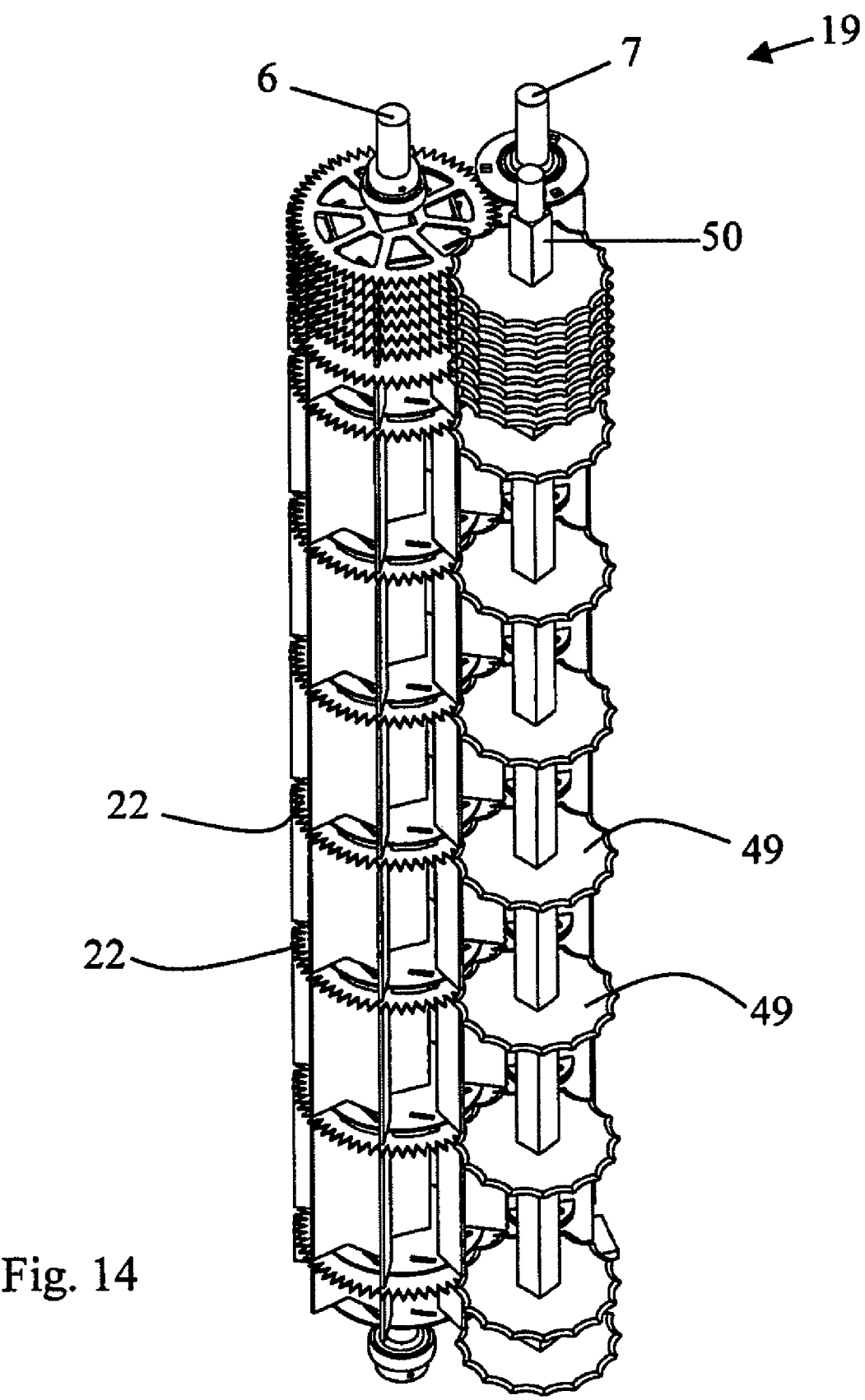
FIG. 14: shows a perspective view of a picking roller arrangement according to a fourth embodiment form.

Shown in FIG. 14 is a perspective partial view of a picking arrangement 19 according to a fourth embodiment form of the invention, in which features that are identical or similar to those in the first embodiment form are labeled with the same reference numerals as in the first embodiment form. The fourth embodiment form differs from the first embodiment form in particular through the fact that the chopping knives 23 are replaced by chopping knives 49 that are attached in a rotationally-fixed manner to a knife roller 50 that is rotatably supported on the support 3, which chopping knives are arranged at a distance from each other. The rotational axis of the knife roller 50 is oriented parallel to the rotational axis of the picking roller 6, the knives 49 being axially displaced with respect to the serrated discs 22 and being formed as discs that overlap with the latter.

Figure 15:
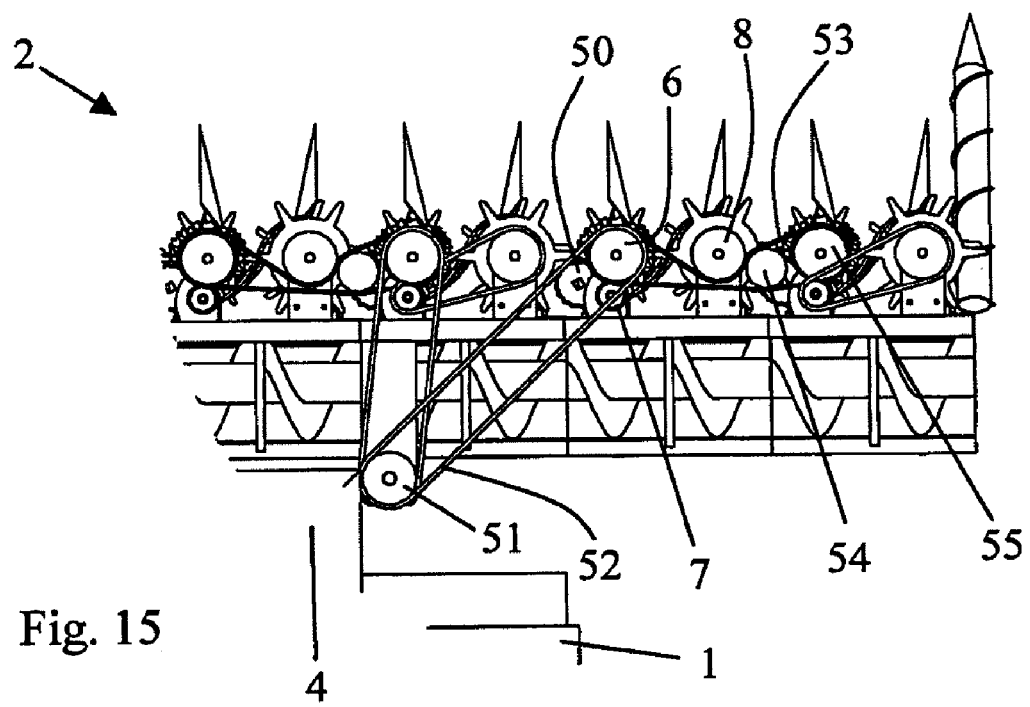
FIG. 15: shows a partial plan view of a picking attachment with drive elements.

Visible in FIG. 15 is a partial plan view of a picking attachment 2 according to the fourth embodiment form with several picking arrangements 19 and drive elements, in order that the drive concept of the rollers 6, 7, and 8 can be made clear. From a drive wheel 51, a belt 52 extends up to the picking roller 6 and drives the latter. From the picking roller 6, a belt 53 extends up to a second picking roller 55 of a neighboring picking attachment, with the interposing of the intake roller 8 and an intermediate wheel 54, so that the intake roller 8 and the second picking roller 55 can be driven. Since the auxiliary roller 7 is engaged with the picking roller 6 via the spur wheels 20 and 21, the auxiliary roller 7 can also be driven. Thus, it is possible to drive the picking roller 6, the auxiliary roller 7, and the intake roller 8 by means of the drive wheel 51. Furthermore, additional belts and/or cogwheels are provided in order to drive the other rollers. For driving the part of the picking attachment 2 not represented in this figure, at least one additional drive wheel can be provided.

Although the drive concept shown in FIG. 15 was explained in reference to the fourth embodiment form, it is transferable to all of the other embodiment forms. Further, this drive concept is merely exemplary, so that it can be substituted or supplemented with other drives, belt drives, and/or gearing systems.

Figure 16:
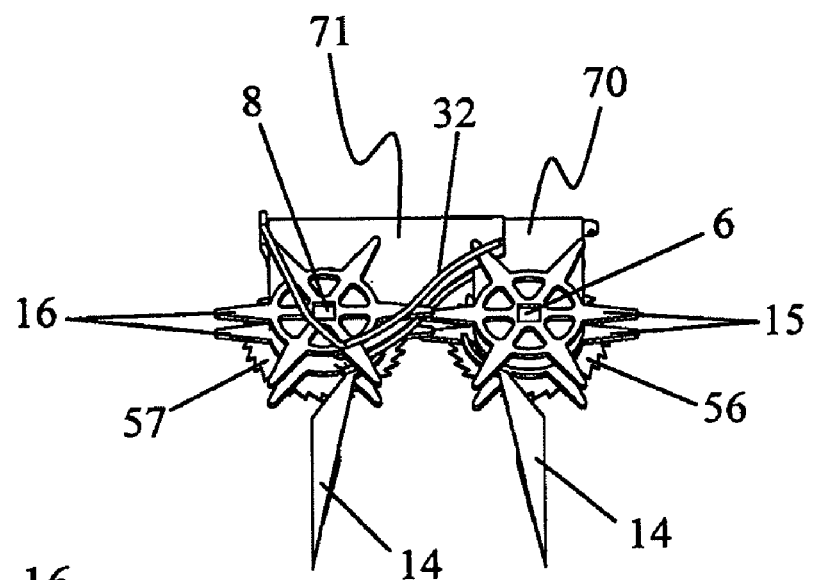
FIG. 16: shows a perspective representation of a carrier and an intake element according to a fifth embodiment form.

Visible in FIG. 16 is a perspective view of carriers 15 and intake elements 16 according to a fifth embodiment form of the invention, in which features that are identical or similar to those in the first embodiment form are labeled with the same reference numerals as in the first embodiment form. Instead of the knives 39 and 40 that are attached fixedly to the support 3 in the first embodiment form, according to the fifth embodiment form at the lower end of the picking roller 6 a knife 56 is connected to the picking roller 6 with the interposing of a gearing 70, and at the lower end of the intake roller 8 a knife 57 is connected to the intake roller 8 with the interposing of a gearing 71. The knives 56 and 47 are disc-shaped and perform the tasks of the knives 39 and 40 according to the first embodiment form.

Figure 17:
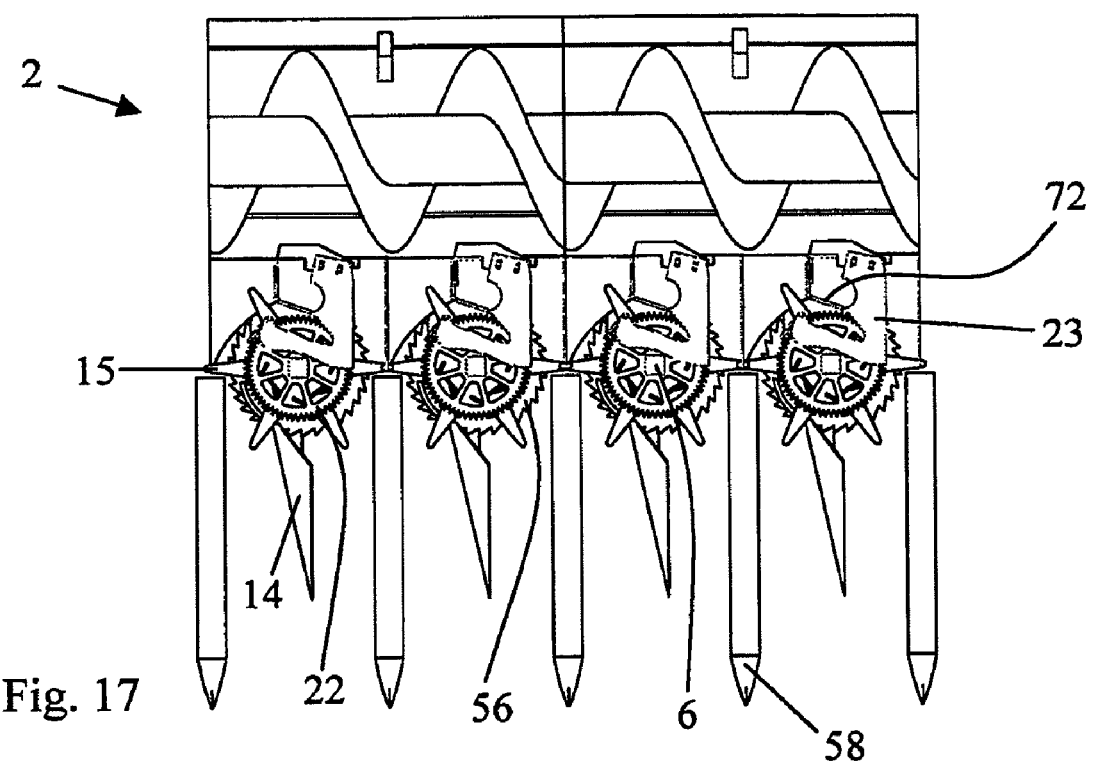
FIG. 17: shows a plan view of a picking attachment according to a sixth embodiment form.

Visible in FIG. 17 is a plan view of a picking attachment 2 according to a sixth embodiment form, in which features that are identical or similar to those in the first embodiment form are labeled with the same reference numerals as in the first embodiment form. In contrast with the first embodiment form, each picking arrangement 19 is formed of merely a single picking roller 6, so that the auxiliary rollers and the intake rollers are eliminated. Further, the knives 39 and 40 according to the first embodiment form are replaced by knives 56 connected to the picking roller 6, as in the case of the fifth embodiment form. Provided in addition are divider spikes 58 that are fixedly attached to the support 3, which spikes are arranged between the picking rollers 6 or the picking arrangements 19, as the case may be, and extend farther away from the harvesting vehicle 1 in the direction of travel 10 than the divider spikes 14. The carriers 15 of two neighboring picking rollers 6 are arranged so as to be axially displaced with respect to each other and can overlap each other. The same holds true for upper carriers 47, which can optionally be present. The picking rollers 6 are in each case partially surrounded by a partial casing 72, by the aid of which the stem or stems 33 can be guided through the respective picking gap 30.

Figure 18:
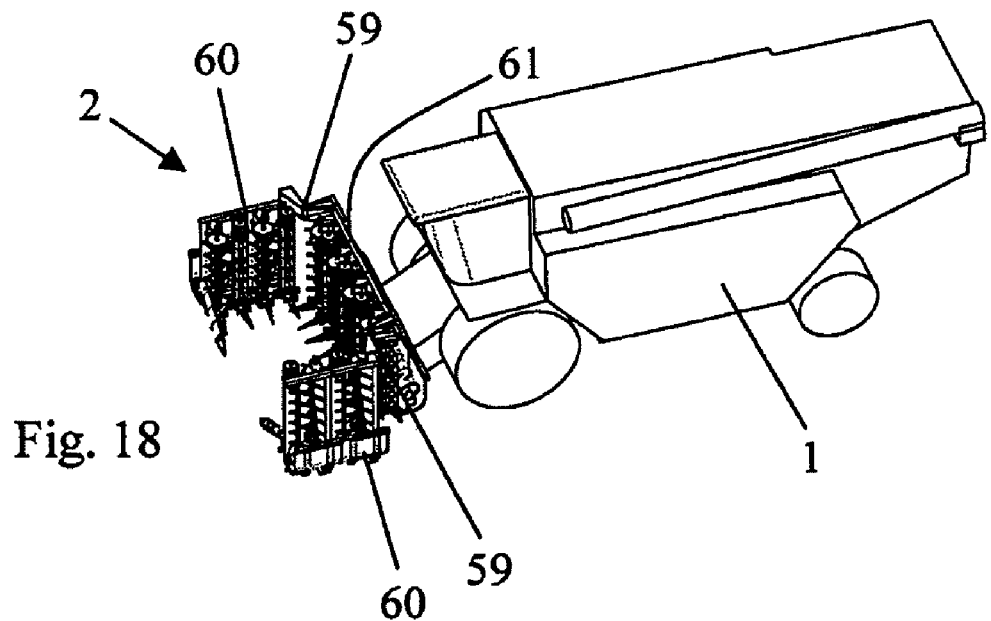
FIG. 18: shows a perspective view of the harvesting vehicle according to FIG. 1, the picking attachment being in the partially folded-together state.

Visible in FIG. 18 is a perspective view of the harvesting vehicle 1, wherein the support or the frame 3 of the picking attachment 2 displays hinges 59, by means of which frame 3 or the picking attachment 2 can be folded. According to FIG. 18, two frame wings 60 having, in each case, two picking arrangements 19 are represented as swung by 90° with respect to the remainder of the frame 61. The frame wings 60 are here connected to the remainder of the frame 61 via the hinges 59.

Figure 19:
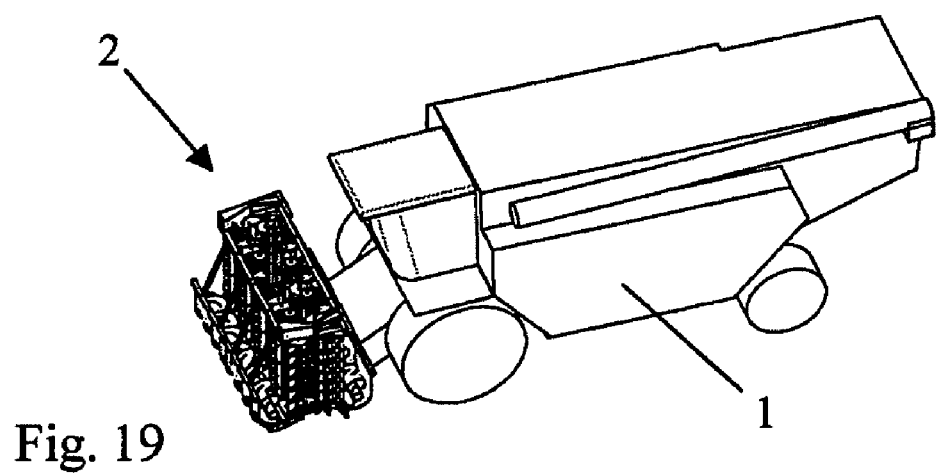
FIG. 19: shows a perspective view of the harvesting vehicle according to FIG. 1, the picking attachment being in the fully folded-together state.

Visible in FIG. 19 is the picking attachment 2 in the completely folded-together state. Since the picking attachment 2 in this state displays a smaller lateral extension than in the unfolded state, the harvesting vehicle 1 can, for example, make use of a public road or an entryway of limited width, without requiring the removal of the picking attachment.

Figure 20:
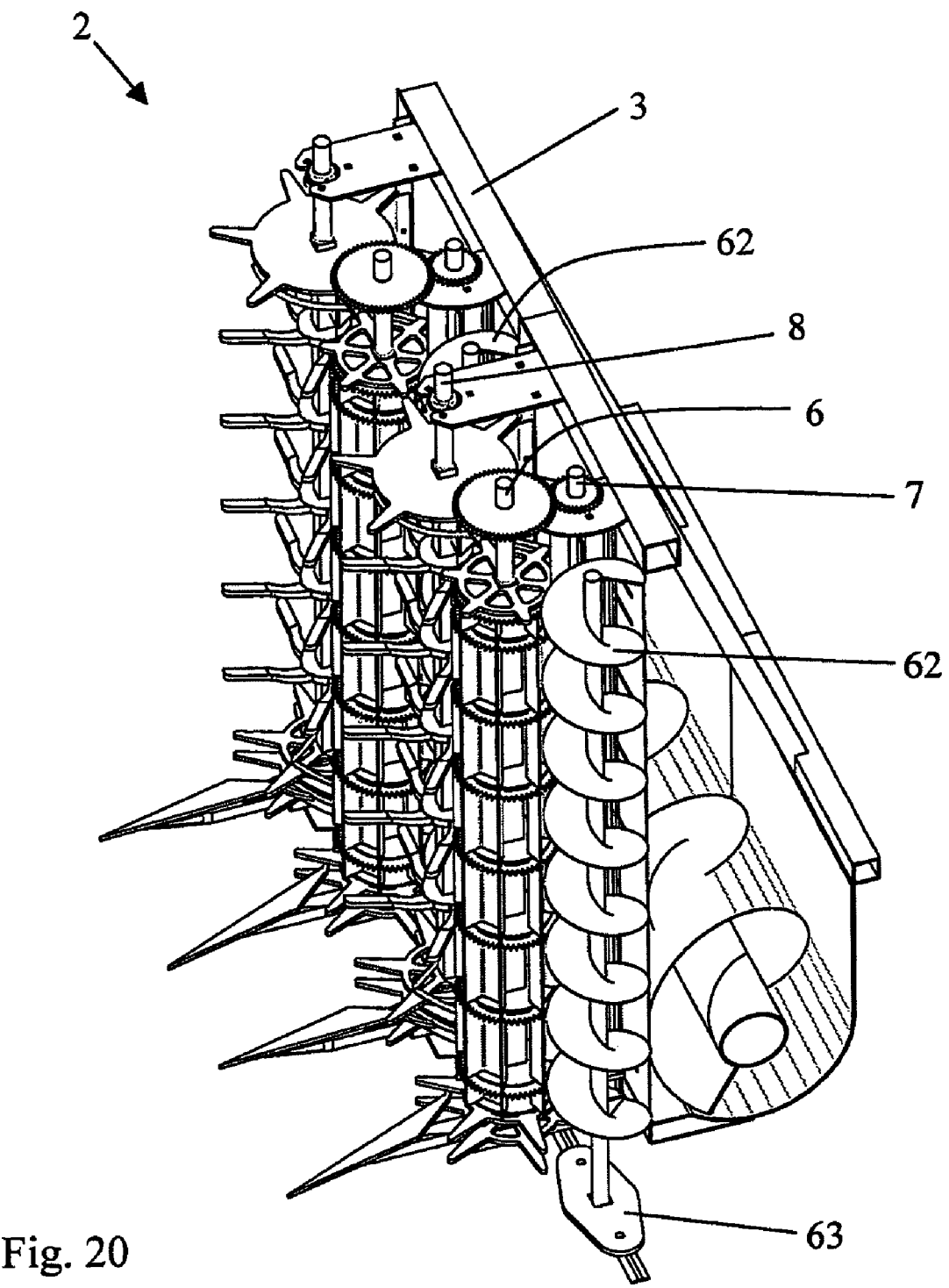
FIG. 20: shows a perspective partial view of a picking attachment according to a seventh embodiment form.

Visible in FIG. 20 is a perspective view of a picking attachment 2 according to a seventh embodiment form, in which features that are identical or similar to those in the first embodiment form are labeled with the same reference numerals as in the first embodiment form. Each picking attachment 19 displays, in comparison with the first embodiment form, the addition of a transport worm 62, the rotational axis of which is oriented parallel to the rotational axis of the picking roller 6. The comminuted or chopped parts of the stem 33 ejected laterally by the picking roller 6 and by the auxiliary roller 7 can be discharged downwardly by means of the transport worm 62. Further, arranged at the end or end region of the transport worm 62 facing the ground 9 is a distribution mallet 63 that is connected to the transport worm in a rotationally-fixed manner, by means of which mallet a residual stubble can be comminuted and/or plant remainders can be purposely distributed.

Each of the embodiment forms can be additionally equipped with a transport worm and/or with a distribution mallet, wherein the latter can also be mounted on the support so as to be rotatable independently of the transport worm.

Figure 21:
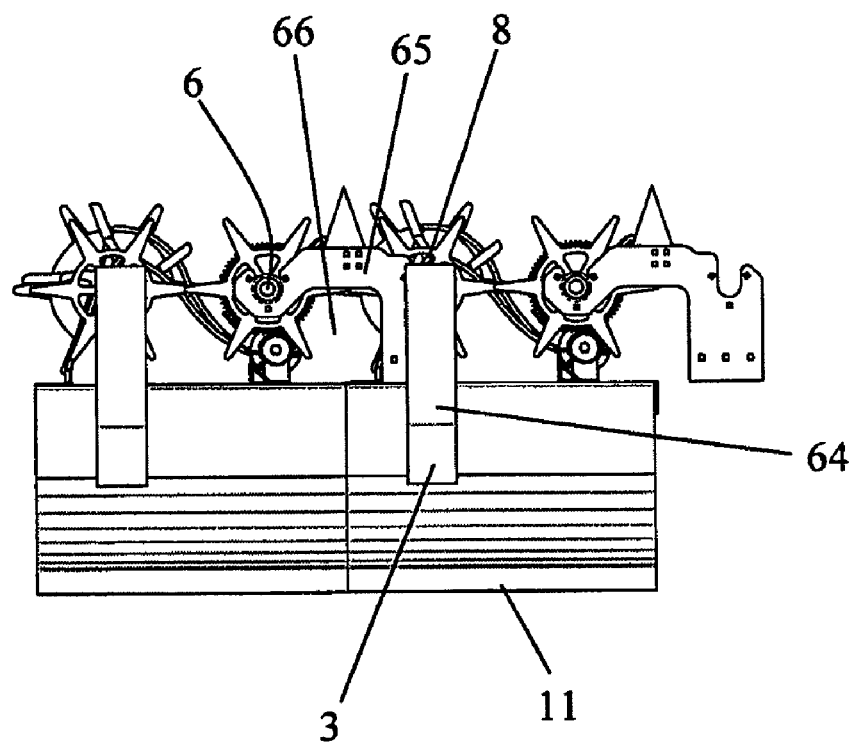
FIG. 21: shows a partial bottom view of a picking attachment according to an eighth embodiment form.

Visible in FIG. 21 is a partial bottom view of a picking attachment 2 according to an eighth embodiment form, in which features that are identical or similar to those in the first embodiment form are labeled with the same reference numerals as in the first embodiment form. In contrast to the first embodiment form, the picking attachment 2 according to the eighth embodiment form displays no chopping knives or separator knives. Rather, the stem 33 can remain connected to the root of the plant 34 situated in the ground 9 and, after being guided through the picking gap 30, is merely laid down. The intake roller 8 and the picking roller 6 are connected to the support 3 via spacers 65, so that between the picking roller 6 and the support 3 or the trough 11 is formed an open space 66, into which the stem 33 is brought after being guided through the picking gap 30 by the picking roller 6 and the auxiliary roller 7 and is laid down in the direction of travel 10 through the moving up of the harvesting vehicle 1. Further provided are accumulation skids 64 on the underside of the trough 11.

Thus, the drive for the picking attachment or for the picking arrangements can turn out to be smaller and more cost-effective, since the power required for the chopping need not be applied.

Figure 22:
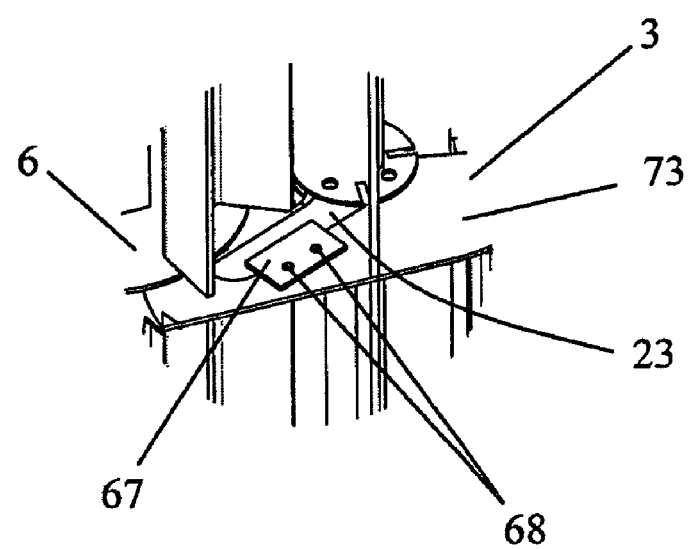
FIG. 22: shows a perspective representation of a chopping knife with exchangeable knife blade.

FIG. 22 shows, in an exemplary manner, one of the chopping knives 23, which is firmly clamped on the support 3 by means of a blade holder 67 and via screws 68. This makes possible, in a simple manner, the removal or replacement of the chopping blade 23 when the latter has become worn.

Figure 23:
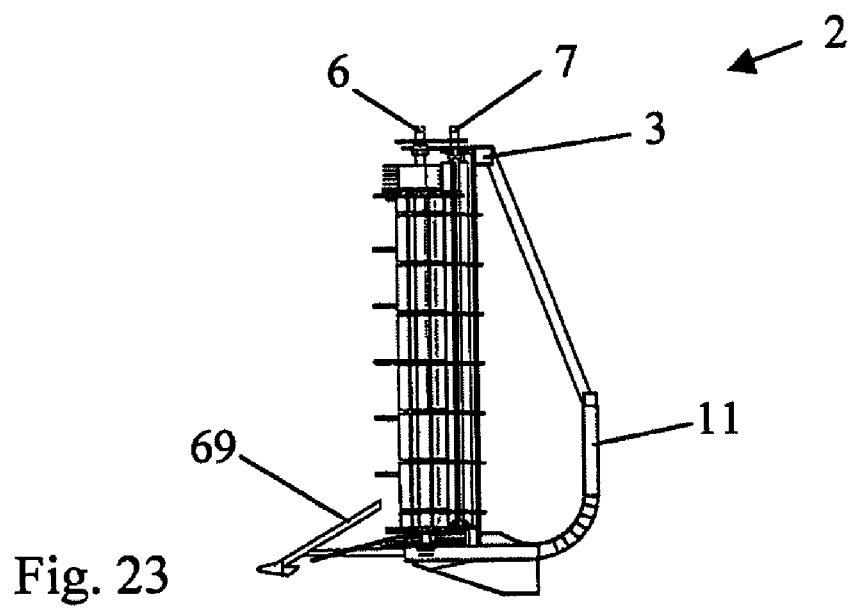
FIG. 23: shows a side view of a picking attachment according to a ninth embodiment form.

Visible in FIG. 23 is a side view of a picking attachment 2 according to a ninth embodiment form of the invention, in which features that are identical or similar to those in the first embodiment form are labeled with the same reference numerals as in the first embodiment form. The ninth embodiment form differs from the first embodiment form through the fact that at least one lifter (lifter for corn lying on the ground) 69 is attached to the picking attachment 2, in particular attached to one of the divider spikes 14, which lifter extends away from the support 3 in the direction of travel 10 and with decreasing distance from the support 3 displays an increasing distance from the ground 9. With the aid of the lifter 69, it is possible to raise up plants that are lying down, so that their stems can be fed to the picking roller 6 or the intake roller 8 for the harvesting of the fruit.

Figure 24:
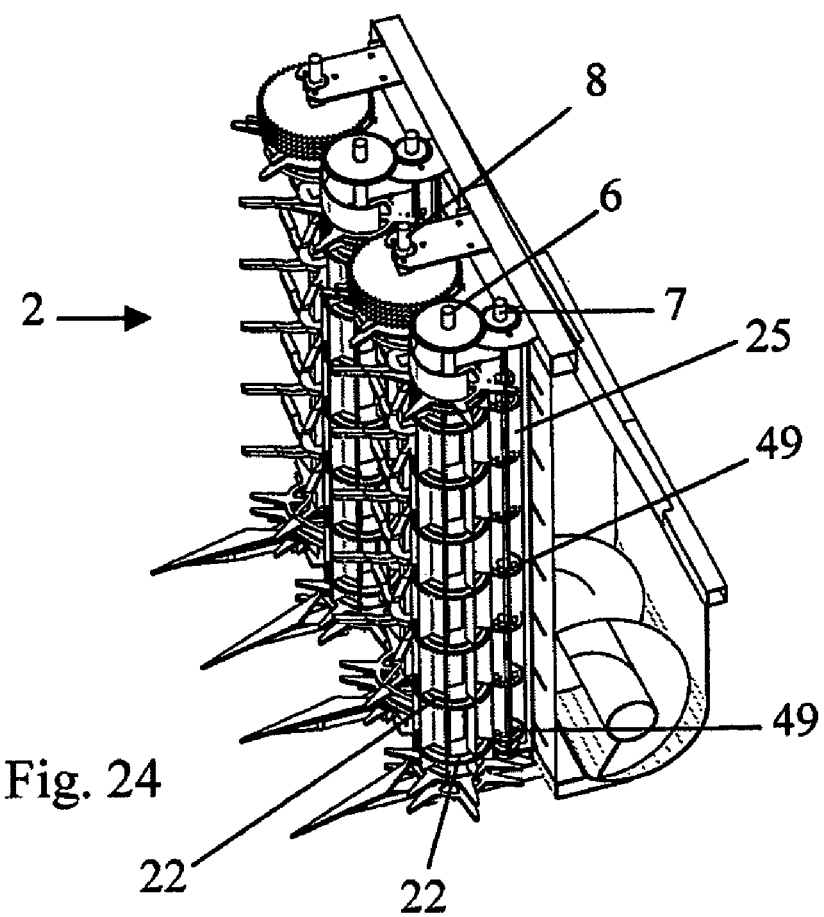
FIG. 24: shows a perspective view of a picking attachment according to a tenth embodiment form.
Figure 25:
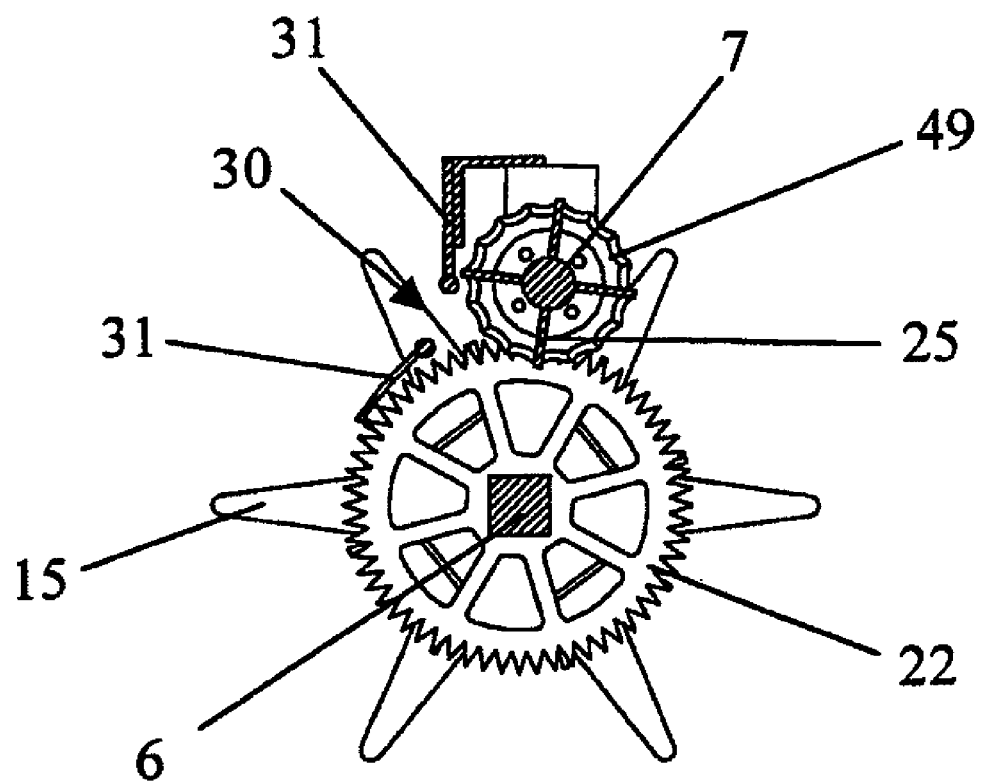
FIG. 25: shows a sectional view through the picking roller arrangement according to FIG. 24.

Visible in FIG. 24 is a perspective partial view of a picking attachment 2 according to a tenth embodiment form of the invention, in which features that are identical or similar to those in the first embodiment form are labeled with the same reference numerals as in the first embodiment form. The tenth embodiment form differs from the first embodiment form in particular through the fact that the chopping knives 23 are replaced by chopping knives 49, which are attached to the auxiliary roller 7 in a rotationally-fixed manner and at a distance from each other. In these intermediate spaces can be arranged the conveying elements or fins 25. Further, the knives 49 are arranged so as to be axially displaced with respect to the serrated discs 22 and are formed as discs that overlap the latter. A sectional view through the picking roller 6 and the auxiliary roller 7 according to FIG. 24 is shown in FIG. 25.

Figure 26:
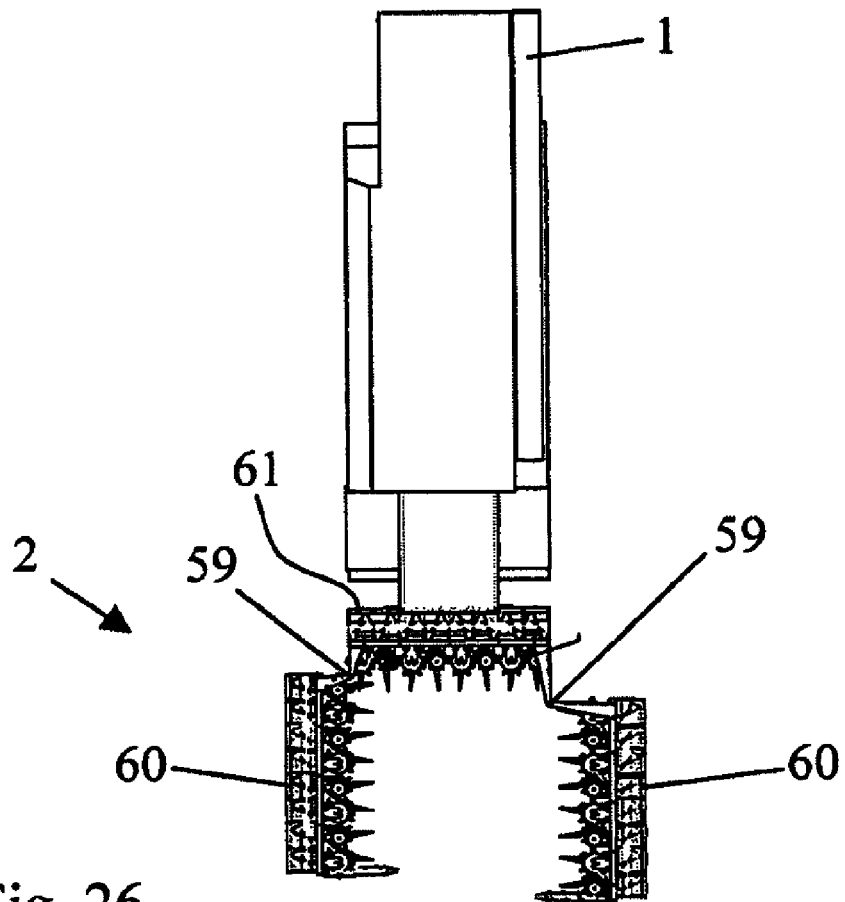
FIG. 26: shows a plan view of a harvesting vehicle with a picking attachment according to an eleventh embodiment form in the partially folded-together state.
Figure 27:
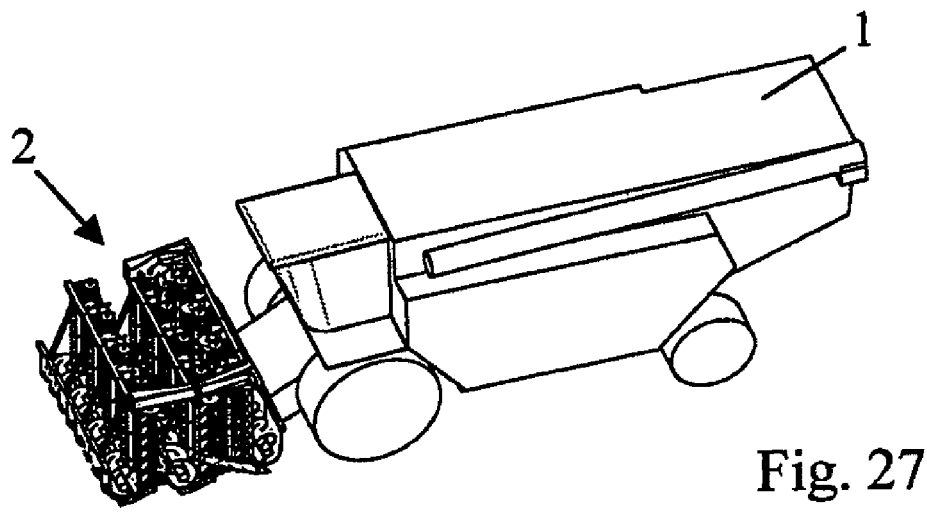
FIG. 27: shows a perspective view of the harvesting vehicle according to FIG. 26 with the picking attachment in the completely folded-together state.

Visible in FIGS. 26 and 27 is a perspective view of a harvesting vehicle 1 with a picking attachment 2 according to an eleventh embodiment form, wherein features that are identical or similar to those in the first embodiment form are labeled with the same reference numerals as in the first embodiment form. In comparison with the first embodiment form, more picking arrangements 19 are attached to the frame 3, wherein an alternative folding concept is realized. The hinges 59 are arranged so as to be displaced with respect to each other when viewed in the direction of travel, so that it is possible to fold the swingable frame wings 60 one over another, i.e. in an overlapping manner.

Figure 28:
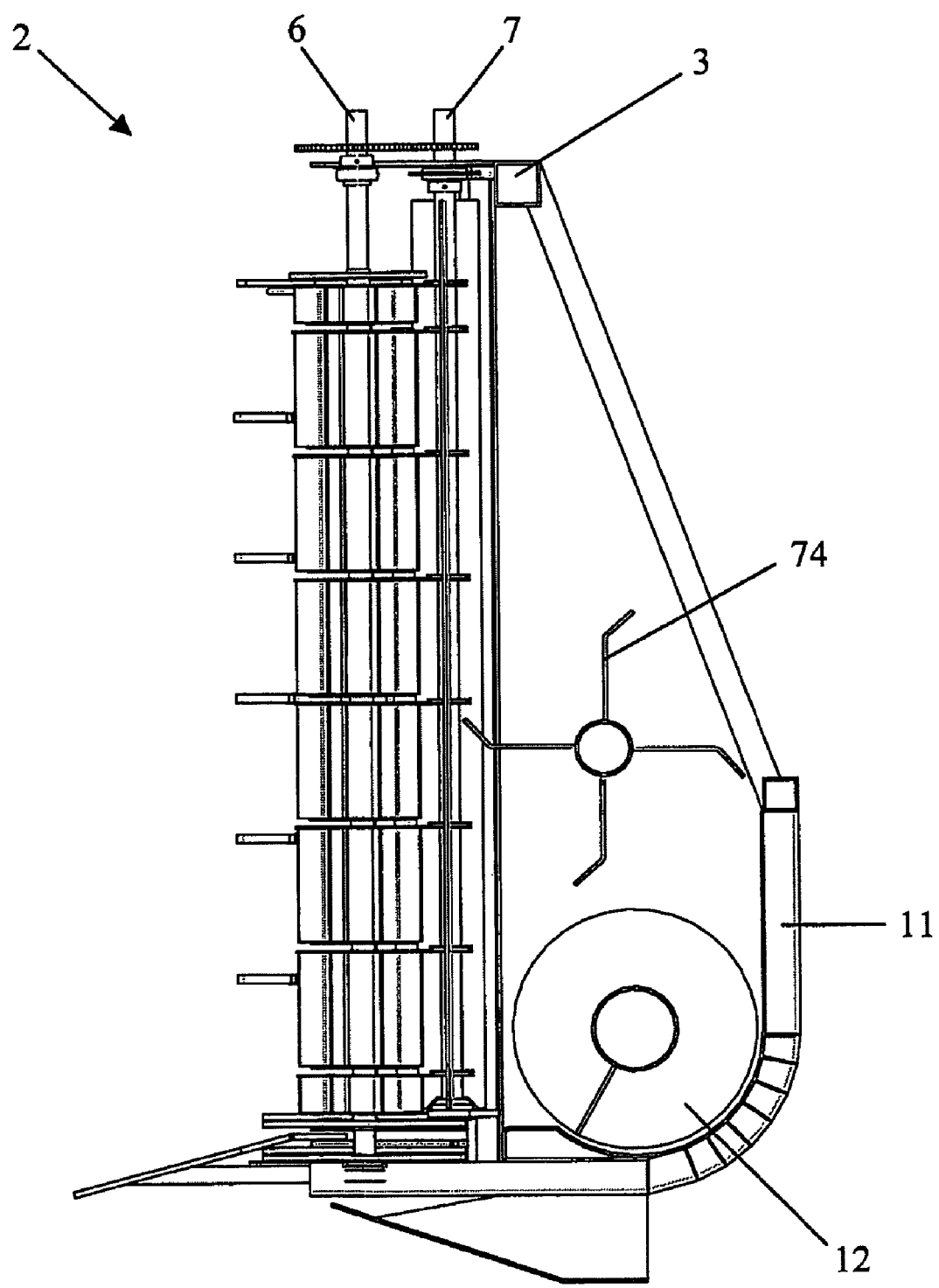
FIG. 28: shows a side view of a picking attachment according to a twelfth embodiment form.

Visible in FIG. 28 is a side view of a picking attachment 2 according to a twelfth embodiment form of the invention, in which features that are identical or similar to those in the first embodiment form are labeled with the same reference numerals as in the first embodiment form. The twelfth embodiment form differs from the first embodiment form in particular through the fact that a transverse-lying chopping roller 74 is provided, which in particular is supported rotatably on the support 3. By means of the chopping roller 74, remainder stems can be collected, chopped, brought together, and/or discharged opposite to the direction of travel 10. Preferably, the chopping roller 74, viewed in the direction of travel 10, is arranged behind the picking gap 30, i.e. behind the rollers 6, 7, and/or 8.

Figure 29:
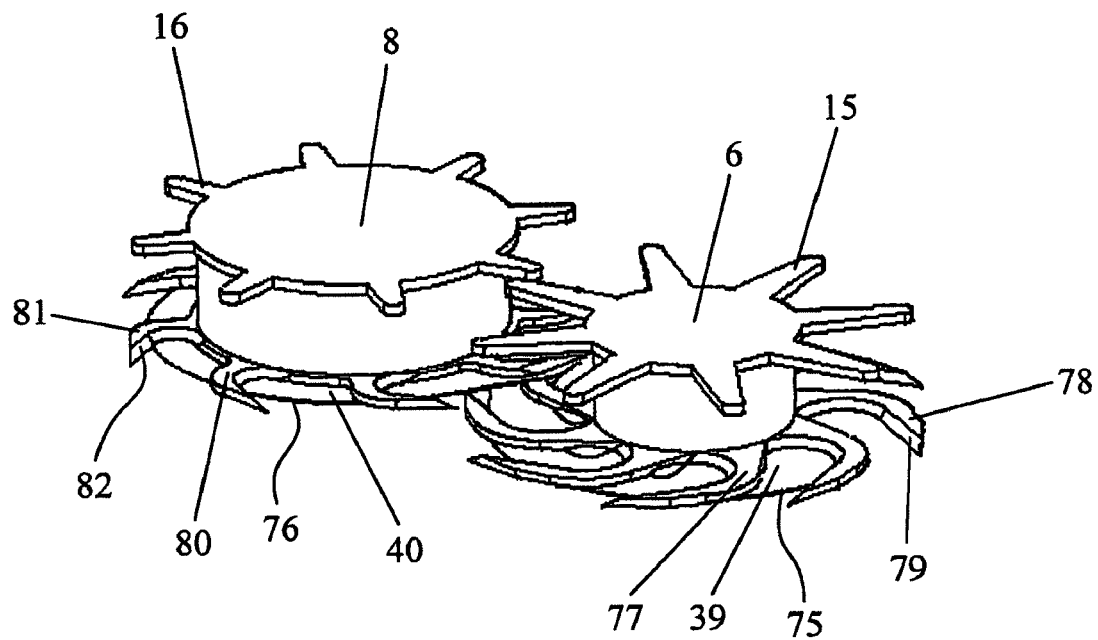
FIG. 29: shows a perspective representation of carriers and intake elements according to a modification of the first embodiment form.
Figure 30:
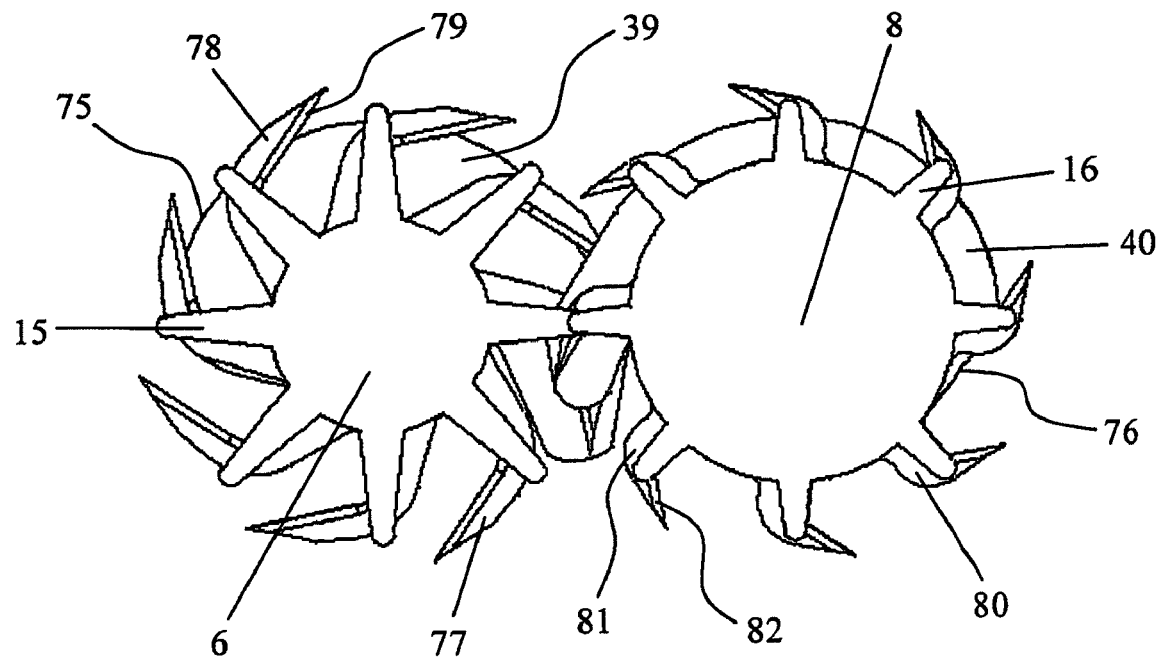
FIG. 30: shows a plan view of the arrangement according to FIG. 29.

Visible in FIG. 29 is a perspective representation of the carriers 15 and the intake elements 16 according to a modification of the first embodiment form, wherein the separating knives 39 and 40 attached to the support 3 are in each case formed as circular or semicircular discs, on whose outer periphery a cutting edge 75 or 76 is provided. The lower carrier is formed as a grasping/cutting wheel 77 and displays several bent or curved fingers 78, which are provided in each case with a cutting edge 79. If a stem 33 is grasped by one of the fingers 78, then the stem 33 can be guided against the cutting edge 75 and cut off in the manner of a shears. After the cutting off, the stem 33, standing up on the disc 39, can be guided in the direction of the picking gap 30 by means of the finger 78 and the upper carrier 15. Further, the lower intake element is designed as a grasping/cutting wheel 80 and displays several bent or curved fingers 81, which are provided in each case with a cutting edge 82. If a stem 33 is grasped by one of the fingers 81, then the stem 33 can be guided against the cutting edge 76 and cut off in the manner of a shears. After the cutting off, the stem 33, standing up on the disc 40, can be guided in the direction of the picking roller 6 by means of the finger 81 and the upper intake element 16. FIG. 30 shows a plan view of the arrangement according to FIG. 29.

Figure 31:
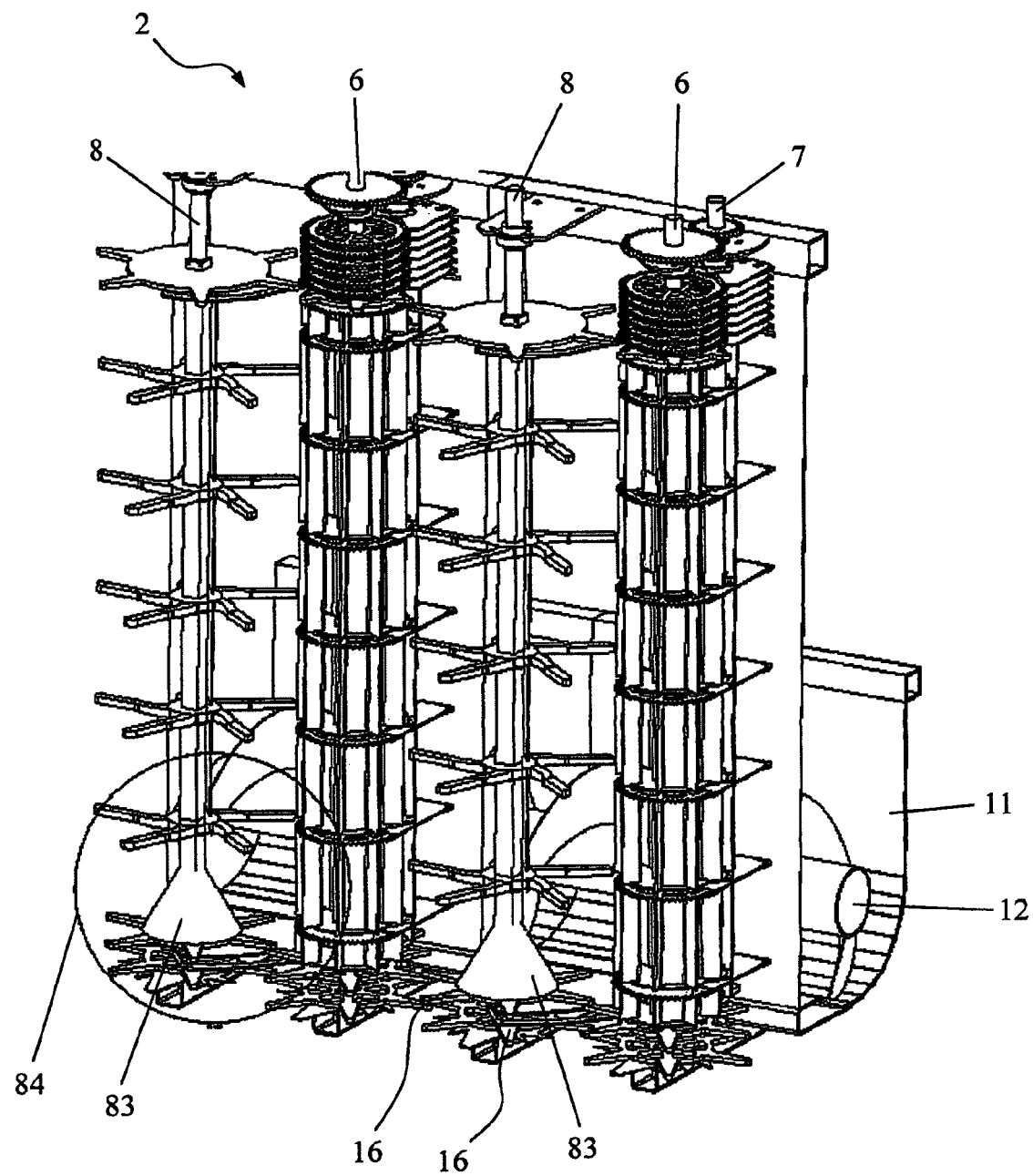
FIG. 31: shows a perspective view of a picking attachment according to a modification of the first embodiment form.
Figure 32:
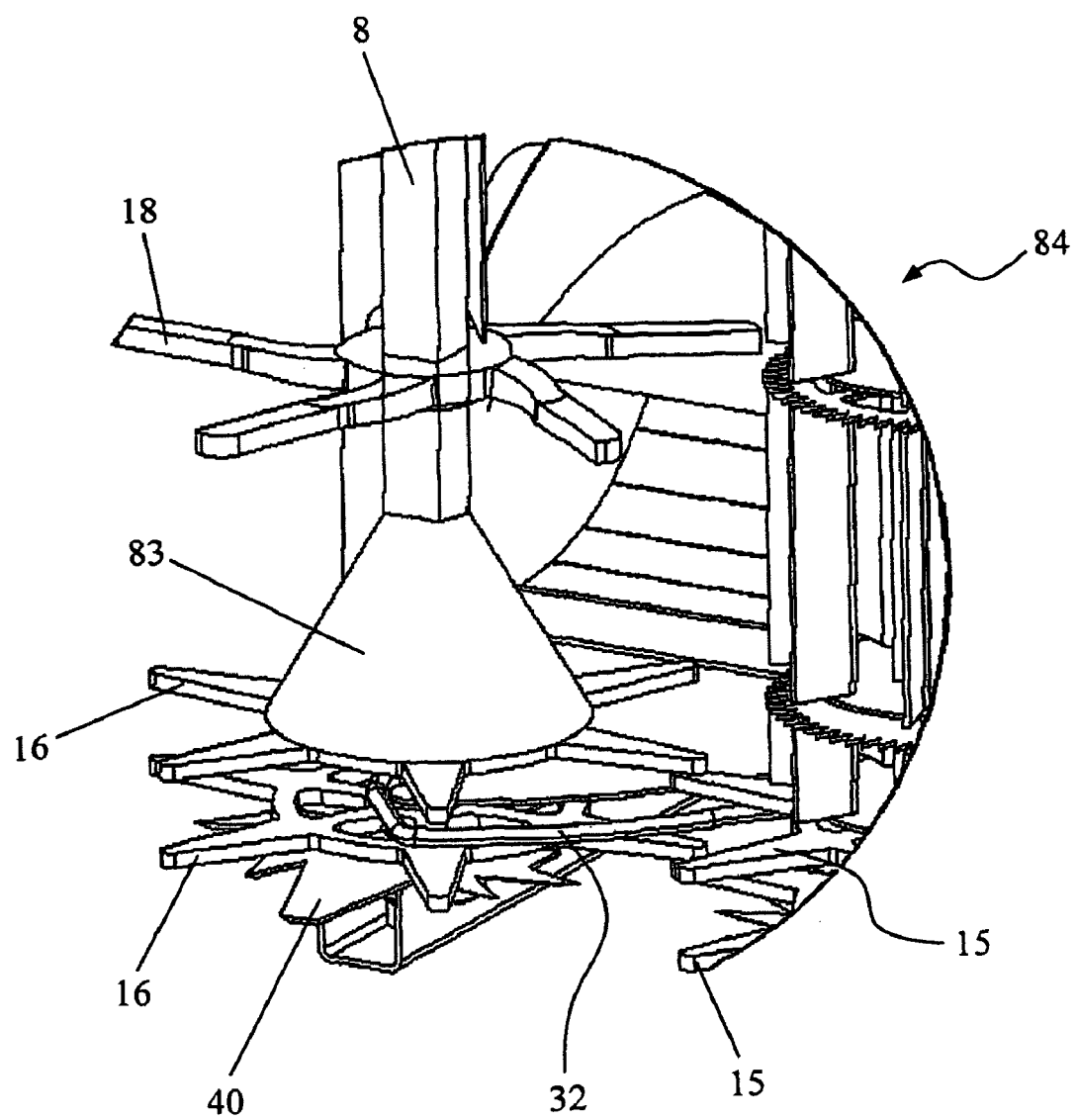
FIG. 32: shows an enlarged view of a detail from FIG. 31.

Visible in FIG. 31 is a perspective view of the picking attachment 2 according to a modification of the first embodiment form, wherein the intake roller 8 is formed as a cone or a frustum at its end region 83 facing the ground 9 and above the intake element 16. In this, the diameter of the cone or frustum increases with decreasing distance to the intake element 16 or to the ground 9. If a fruit 36, having been separated from the stem 33, falls downward at a short distance from the rotational axis of the intake roller 8, the fruit 36 is then guided by the cone or frustum into the region of the radially outer ends of the intake elements 16, so that the fruit 36 can be more certainly guided rearward in the direction of the screw conveyor 12 or the trough 11. FIG. 32 shows an enlarged view of the detail 84 indicated in FIG. 31.

Figure 33:
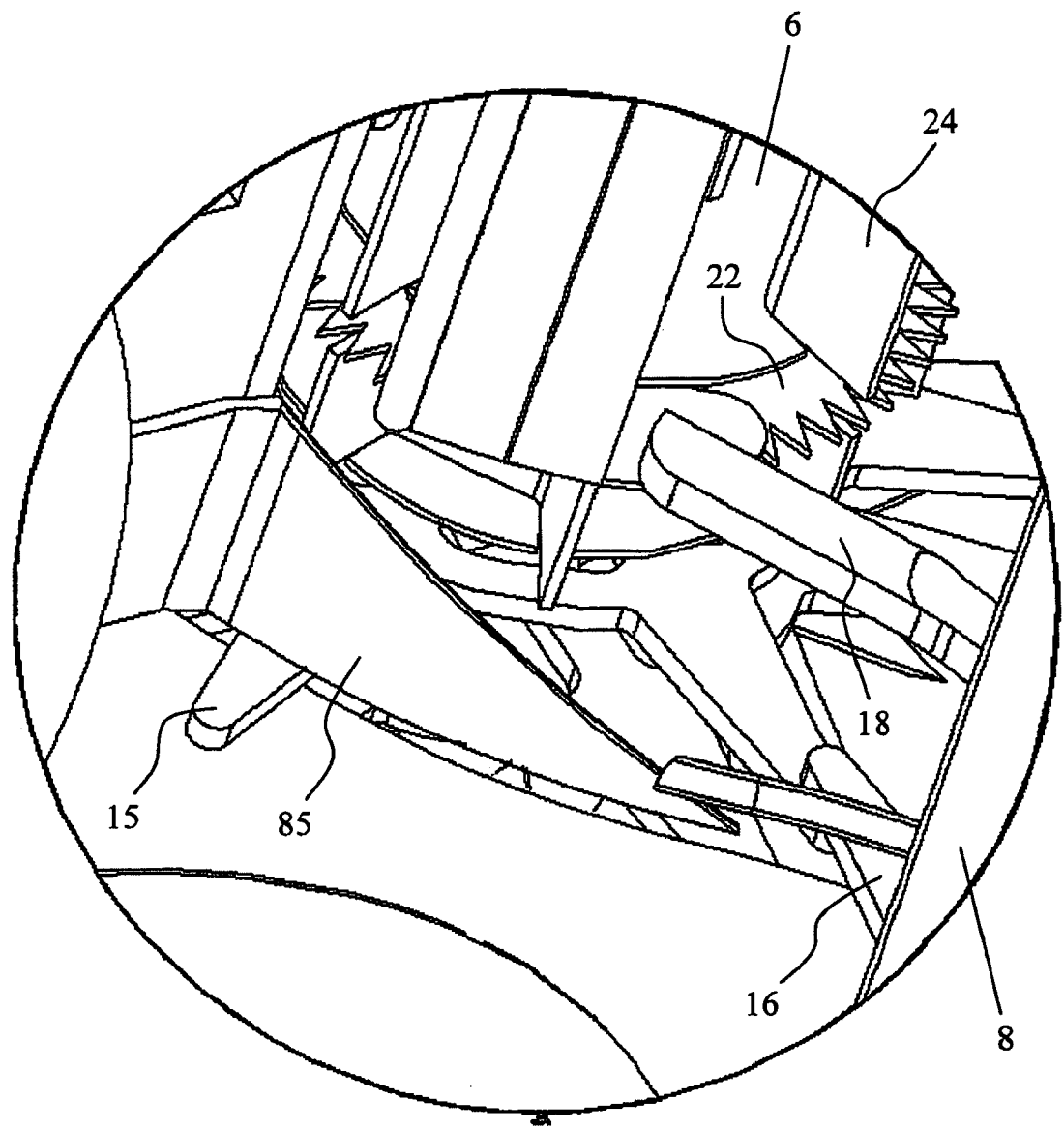
FIG. 33: shows a perspective partial view of a picking arrangement according to a modification of the first embodiment form.

Visible in FIG. 33 is a perspective partial view of a picking arrangement or one of the picking arrangements 19 according to a modification of the first embodiment form, wherein attached to the support 3 in the region between the picking roller 6 and the intake roller 8 is a guide plate 85, which is inclined upward, or runs diagonally upward, in a direction from the intake roller 8 up to the picking roller 6 and extends in a curved manner around the picking roller 6 toward the picking gap 30. The guide plate 85 prevents a fruit 36, having been separated from the stem 33, from falling back again in the direction of the picking gap 30. Several such guide plates 85 can be arranged on the support 3 at a distance from each other along the longitudinal axis of the picking roller 6 or the picking gap 30.

Figure 34:
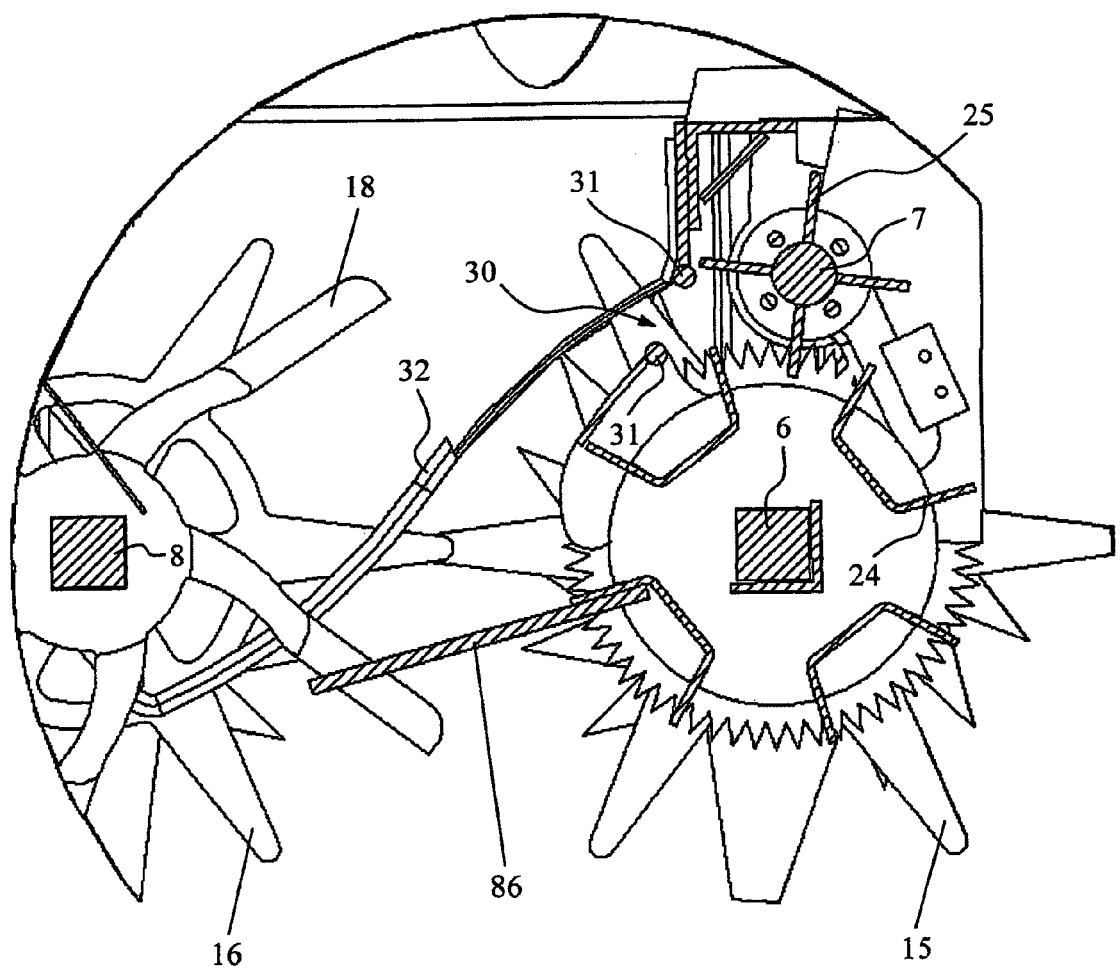
FIG. 34: shows a sectional view through a picking arrangement according to a modification of the first embodiment form.

Visible in FIG. 34 is a sectional view through a picking arrangement or one of the picking arrangements 19 according to a modification of the first embodiment form, wherein attached to the fins 24 of the picking roller 6 is at least one elastic finger 86, which extends away from the picking roller 6 in a radial or approximately radial manner. For the sake of clarity, only one elastic finger 86 is shown here. However, several such elastic fingers can be provided around the rotational axis of the picking roller 6, which fingers are, in particular, similarly formed. Further, several such elastic fingers can be arranged along the rotational axis of the picking roller at a distance from each other. The at least one elastic finger or the elastic fingers 86 facilitate(s) the receiving of the stem 33 or the plant 34 over the entire length. In this, the elastic finger 86 extends from the picking roller 6 over a length that is greater than the distance between the picking roller 6 and the picking gap 30, so that the elastic finger 86 becomes deflected at the picking gap 30 or at the edges of the picking gap or the lateral elements 31 when being led past there. After the deflecting, the elastic finger 86 automatically reassumes the shape it had prior to the deflecting, which means that the elastic finger 86 consists in particular of a springy material. Preferably, the elastic finger 86 is produced from an elastic or springy plastic such as, for example, polyurethane (PUR).

Figure 35:
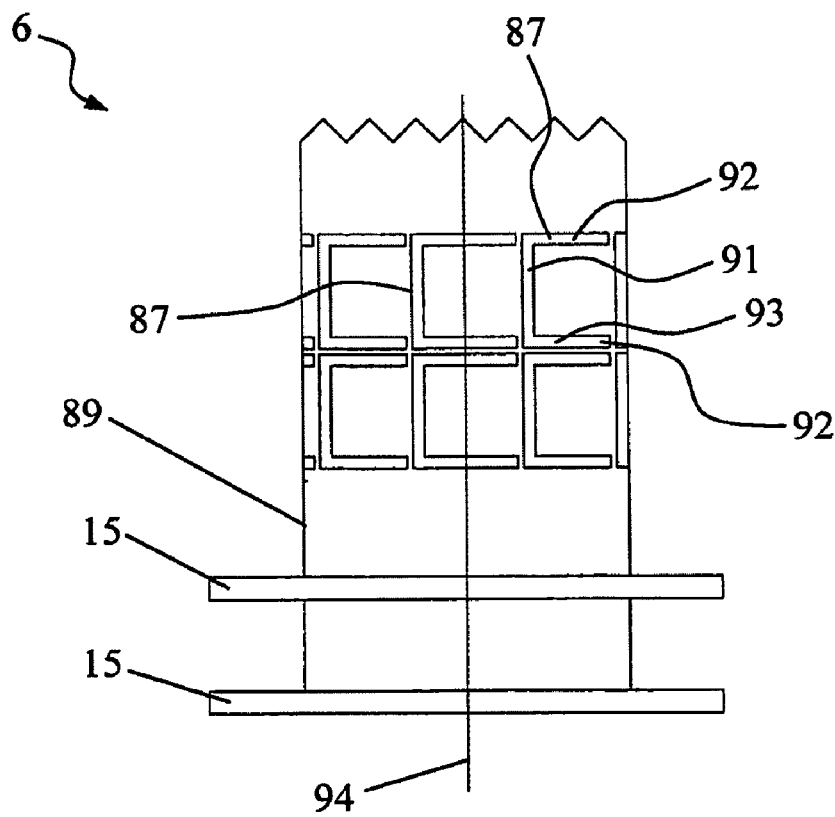
FIG. 35: shows a side view of a picking roller according to a modification of the first embodiment form.
Figure 36:
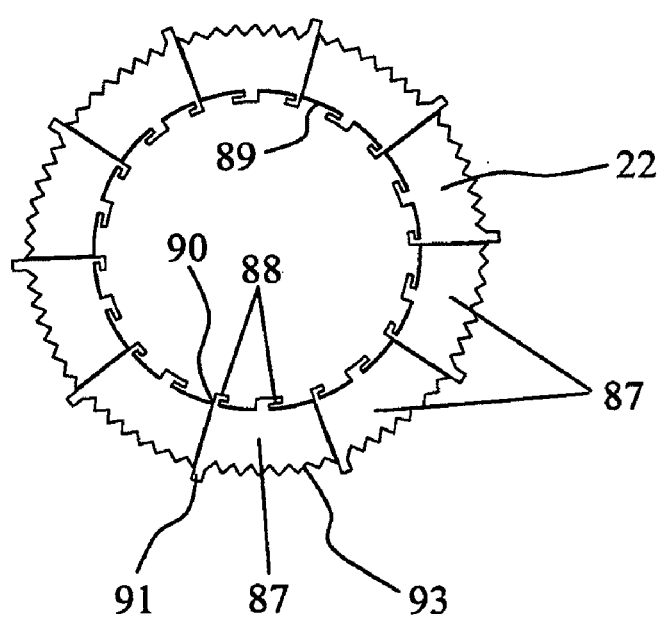
FIG. 36: shows a sectional view through the picking roller according to FIG. 35.

Visible in FIG. 35 is a schematic and lateral partial view of a picking roller 6 according to a modification of the first embodiment form, wherein the serrated discs 22 and the fins 24 are composed of U-shaped segments 87, which are arranged all around the rotational axis 94 of the picking roller 6. FIG. 36 shows a schematic sectional view through this picking roller 6. The segments 87 are connected to the roller body 89, designed as a pipe, by means of a plug/clamp mechanism and display plug feet 88 that extend through slots 90 provided in the roller body 89 and grasp behind the roller body 89 or rather the wall of the latter. The legs 92 of the U-shaped segments 87, which legs are connected to each other via a back 91, are provided with serrations 93, so that the segments 87 arranged all around the rotational axis 94 of the picking roller 6 form the serrated discs 22, between which the backs 91 are arranged, which backs form the fins 24. The backs 91 can be designed as ripping edges that are radially lengthened in comparison to the legs 92.

The described embodiment forms do not represent a limitation of the invention. In particular, the features of all of the embodiment forms are in principle freely combinable with each other.

REFERENCE NUMERAL LIST 1. harvesting vehicle
2. picking attachment
3. support/frame
4. inclined conveyor
5. collection container
6. picking roller
7. auxiliary roller
8. intake roller
9. ground
10. direction of travel
11. trough
12. screw conveyor
13. plant guide
14. divider spike
15. carrier
16. intake element
17. intake element
18. intermediate element
19. picking arrangement
20. spur wheel
21. spur wheel
22. serrated disc
23. chopping knife
24. fin
25. fin
26. intermediate space
27. comminutor
28. serrated disc
29. knife
30. picking gap
31. plate/edge
32. intake guide
33. plant stem
34. plant
35. width of the picking gap
36. fruit
37. curved guide
38. curved guide
39. knife
40. knife
41. knife blade
42. ripping edge
43. splitting element
44. comminutor
45. serrated disc
46. guide element
47. carrier
48. gap
49. chopping knife
50. knife roller
51. drive wheel
52. belt
53. belt
54. intermediate wheel
55. picking roller
56. knife
57. knife
58. divider spike
59. hinge
60. frame wing
61. remainder of frame
62. transport worm
63. distribution mallet
64. accumulation skid
65. support
66. open space
67. blade holder
68. screw
69. lifter
70. gearing
71. gearing
72. partial casing
73. edge support
74. chopping roller
75. cutting edge
76. cutting edge
77. grasping/cutting wheel
78. finger
79. cutting edge
80. grasping/cutting wheel
81. finger
82. cutting edge
83. conical region of the intake roller
84. detail
85. guide plate
86. elastic finger
87. segment
88. plug foot
89. roller body
90. slot
91. back
92. leg
93. serration
94. rotational axis

What is claimed is:

1. Picking arrangement for the picking of at least one fruit located on an elongate stem of a plant comprising:
   a support movable along the ground; the support having a longitudinal axis, the support forming an elongate picking gap around the longitudinal axis and being bounded by lateral edges, the support being configured to guide the stem through the picking gap without the fruit while the fruit is separated from the stem at the edges;
   the support being positioned with the longitudinal axis oriented substantially vertically relative to the ground;
   at least one carrier movably guided on the support, wherein the at least one carrier is configured to grasp the stem and feed the stem to the picking gap with a longitudinal axis of the stem oriented substantially parallel to the longitudinal axis of the support;
   at least one intake roller rotatably mounted on the support, the rotational axis of the roller being oriented parallel to the longitudinal axis of the support,
   at least one intake element extending radially away from the rotational axis of the intake roller attached to the intake roller.

2. Picking arrangement according to claim 1, wherein the carrier is configured to guide the stem through the picking gap.

3. Picking arrangement according to claim 1, wherein the carrier is attached to the picking roller.

4. Picking arrangement according to claim 3, wherein the picking roller, viewed in a direction of movement of the picking arrangement, is arranged alongside or in front of the picking gap.

5. Picking arrangement according to claim 3 wherein the carrier extends radially to the rotational axis of the picking roller and the distance between the rotational axis of the picking roller and a radial outer end of the carrier is greater than or equal to the distance between the rotational axis of the picking roller and the picking gap.

6. Picking arrangement according to claim 3, further comprising a plurality of conveying elements arranged spaced apart from each other along the rotational axis of the picking roller, wherein the conveying elements are configured to convey the stem or stem parts away from the picking gap after having been guided through the picking gap.

7. Picking arrangement according to claim 6, wherein the conveying elements include serrated discs and/or fins.

8. Picking arrangement according to claim 3, further comprising:
at least one auxiliary roller rotatably mounted on the support, a rotational axis of the auxiliary roller being oriented parallel to the longitudinal axis of the support,
a plurality of conveying elements arranged spaced apart from each other along the rotational axis of the picking roller, wherein the conveying elements are configured to convey the stem or stem parts away from the picking gap after having been guided through the picking gap.

9. Picking arrangement according to claim 8, wherein the conveying elements include serrated discs and/or fins, and wherein the conveying elements of the auxiliary roller comprise fins configured to mesh with the fins of the conveying elements.

10. Picking arrangement according to claim 9, wherein projections, formed as ripping edges, are attached to the picking roller and positioned intermediate the fins.

11. Picking arrangement according to claim 8, wherein the picking roller and the auxiliary roller are rotatable with peripheral velocities that are different relative to each other.

12. Picking arrangement according to claim 3, further comprising a plurality of splitting elements attached to the support at a distance from each other along an axis oriented parallel to the longitudinal axis of the picking gap, wherein the splitting elements are configured to guide the stem or stem parts between the splitting elements and the picking roller and to split up the stem and stem parts.

13. Picking arrangement according to claim 3, further comprising at least one picking strip provided on the picking roller, wherein the picking strip extends parallel to the rotational axis of the picking roller or extends in the direction of the rotational axis of the picking roller in a spiral-like manner around the rotational axis of the picking roller.

14. Picking arrangement according to claim 7, wherein at least one picking strip is formed through the fins of the picking roller.

15. Picking arrangement according to claim 3, wherein at least one separator knife is attached to an end region of the picking roller facing the ground, wherein the knife is configured to separate the stem from the root of the plant.

16. Picking arrangement according to claim 3, wherein at least one separator knife is rigidly attached to the support, wherein the carrier is configured to guide the stem against the knife and separate the stem from the root of the plant.

17. Picking arrangement according to claim 3, further comprising a comminuter provided at an end of the picking roller facing away from the ground, wherein the comminuter is configured to comminute a part of the stem.

18. Picking arrangement according to claim 3, further comprising at least one divider spike and a curved guide attached to the support, wherein the guide partially surrounds the picking roller and the carrier is configured to guide the stem in the direction of the picking gap along the guide.

19. Picking arrangement according to claim 3, wherein the carrier is attached to the picking roller in a detachable manner or is variable in shape.

20. Picking arrangement according to claim 1, wherein a plurality of chopping knives are arranged spaced apart from each other along an axis oriented parallel to the longitudinal axis of the support, wherein the chopping knives are configured to cut up the stem into multiple pieces.

21. Picking arrangement according to claim 20, wherein the chopping knives are rigidly attached to the support or to a chopping roller that is rotatably mounted on the support, wherein the rotational axis of the roller is oriented parallel to the longitudinal axis of the support.

22. Picking arrangement according to claim 20 wherein the chopping knives are attached to the picking roller.

23. Picking arrangement according to claim 1, wherein at least one separator knife is attached to an end region of the picking roller facing the ground, wherein the knife is configured to separate the stem from the root of the plant.

24. Picking arrangement according to claim 1, wherein at least one separator knife is rigidly attached to the support, wherein the intake element is configured to guide the stem against the knife and separate the stem from the root of the plant.

25. Picking arrangement according to claim 1, wherein a divider spike and a curved guide are attached to the support, wherein the guide partially surrounds the intake roller and the intake element is configured to guide the stem along the guide in the direction of the carrier.

26. Picking arrangement according to claim 1, wherein the intake element is attached to the intake roller in a detachable manner or is variable in shape.

27. Picking arrangement according to claim 3 wherein at least one intake guide is arranged between the intake roller and the picking roller, wherein the intake guide is configured to guide the stem along the intake guide in the direction of the carrier.

28. Picking arrangement according to claim 27, wherein the carrier and the intake guide are arranged to be axially displaced with respect to each other, wherein the sum of the distance between a radially outer end of the carrier and the rotational axis of the picking roller and the distance between a radially outer end of the intake guide and the rotational axis of the intake roller is greater than or equal to the distance between the rotational axis of the picking roller and the rotational axis of the intake roller.

29. Picking arrangement according to claim 1, wherein the picking gap is inclined with respect to the vertical direction.

30. Picking arrangement according to claim 1, further comprising a plant guide attached to the support, wherein the plant guide is configured to incline the plant away from the picking gap.

31. Picking arrangement according to claim 1, wherein the picking arrangement comprises a chopping roller configured to discharge an upper remainder piece of the plant above the picking arrangement in a direction opposite to a movement direction of the picking arrangement.

32. Picking arrangement according to claim 1, further comprising at least one second carrier movably guided on the support, wherein the first and second carriers are configured to feed the stem to the picking gap with the longitudinal axis of the stem oriented substantially parallel to the longitudinal axis of the support, wherein the carriers are spaced apart from each other.

33. Picking arrangement according to claim 32, wherein the first and second carriers are configured to guide the stem through the picking gap by both the first carriers and the second carriers.

34. Picking arrangement according to claim 3 wherein the second carrier is attached to the picking roller and wherein the first carrier and the second carrier are spaced apart from each other.

35. Picking arrangement according to claim 1, wherein the support is attached to a vehicle.

36. Picking arrangement according to claim 1, wherein a rotatable distribution mallet is arranged on the support, wherein a residual stubble of the plant sitting in the ground, can be comminuted or plant remains can be discharged by the mallet.

37. Picking arrangement according to claim 1, wherein the plant is a corn plant or a sunflower.

38. Picking arrangement according to claim 16, wherein the separator knife is farmed as a disc and the carrier includes at least one bent or curved finger having a cutting edge.

39. Picking arrangement according to claim 24, wherein the separator knife is formed as a disc and the intake element includes at least one bent or curved finger having a cutting edge.

40. Picking arrangement according to claim 1, wherein the intake roller includes a frustum-shaped region above the intake element, wherein the diameter of the region increases with decreasing distance from the intake element.

41. Picking arrangement according to claim 3, further comprising a guide plate attached to the support and at least one intake roller rotatably mounted on the support, wherein the plate is upwardly inclined in a direction from the intake roller up to the picking roller and extends in a curved manner around the picking roller toward the picking gap.

42. Picking arrangement according to claim 3, further comprising at least one elastic finger attached to the picking roller, wherein the finger extends away from the picking roller in an approximately radial manner over a distance that is greater than the distance between the picking roller and the picking gap.

43. Picking arrangement according to claim 6, wherein the conveying elements include segments that are arranged around the rotational axis of the picking roller and are connected to the picking roller via plug connections, wherein each of the segments includes a back and legs running transversely to the back, at least one of the legs is provided with serrations.

44. Picking attachment with a frame and a plurality of side-by-side arranged picking arrangements according to claim 1, wherein the supports are placed together on the frame or are formed by the frame.

45. Picking attachment according to claim 44, wherein the frame includes a plurality of swingable, interconnectable frame parts and is formed so that it can be folded together.

* * * * *